US011188082B2

(12) United States Patent
Silva et al.

(10) Patent No.: US 11,188,082 B2
(45) Date of Patent: Nov. 30, 2021

(54) OCCLUSION PREDICTION AND TRAJECTORY EVALUATION

(71) Applicant: Zoox, Inc., Foster City, CA (US)

(72) Inventors: William Anthony Silva, San Francisco, CA (US); Chuang Wang, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 184 days.

(21) Appl. No.: 16/246,208

(22) Filed: Jan. 11, 2019

(65) Prior Publication Data

US 2020/0225669 A1 Jul. 16, 2020

(51) Int. Cl.
| | |
|---|---|
| *G05D 1/02* | (2020.01) |
| *G06N 20/00* | (2019.01) |
| *G01S 17/06* | (2006.01) |
| *G01S 17/58* | (2006.01) |
| *G01S 17/89* | (2020.01) |
| *G05D 1/00* | (2006.01) |

(52) U.S. Cl.
CPC ............ *G05D 1/0214* (2013.01); *G01S 17/06* (2013.01); *G01S 17/58* (2013.01); *G01S 17/89* (2013.01); *G05D 1/0088* (2013.01); *G05D 1/0221* (2013.01); *G05D 1/0238* (2013.01); *G05D 1/0257* (2013.01); *G06N 20/00* (2019.01)

(58) Field of Classification Search
CPC .......... B60W 60/0011; B60W 60/0027; G05D 1/0214; G01S 17/06; G01S 17/58; G01S 17/93
USPC .......................................................... 701/23
See application file for complete search history.

(56) References Cited

U.S. PATENT DOCUMENTS

| | | | |
|---|---|---|---|
| 10,331,135 B2* | 6/2019 | Gao | G05D 1/0257 |
| 10,488,861 B2* | 11/2019 | Allan | G06K 9/00805 |
| 2013/0245877 A1* | 9/2013 | Ferguson | G08G 1/167 |
| | | | 701/23 |
| 2016/0132058 A1* | 5/2016 | Lee | G05D 1/0214 |
| | | | 701/26 |

(Continued)

OTHER PUBLICATIONS

Arnay, et al., "Safe and Reliable Path Planning for the Autonomous Vehicle Verdino", IEEE Intelligent Transportation Systems Magazine, IEEE, USA, vol. 8, No. 2, Jul. 1, 2016, pp. 22-32.

(Continued)

*Primary Examiner* — Thomas G Black
*Assistant Examiner* — Matthias S Weisfeld
(74) *Attorney, Agent, or Firm* — Lee & Hayes, P.C.

(57) ABSTRACT

Techniques are discussed for controlling a vehicle, such as an autonomous vehicle, based on predicted occluded areas in an environment. An occluded area can represent areas where sensors of the vehicle are unable to sense portions of the environment due to obstruction by another object. A first occluded region for an object is determined at a first time based on a location of the object. A predicted location for the object can be used to determine a predicted occluded region caused by the object at a second time after the first time. Predicted occluded regions can be determined for multiple trajectories for the vehicle to follow and/or at multiple points along such trajectories, and a trajectory can be selected based on associated occlusion scores and/or trajectory scores associated therewith. The vehicle can be controlled to traverse the environment based on the selected trajectory.

20 Claims, 10 Drawing Sheets

(56) References Cited

U.S. PATENT DOCUMENTS

| | | | |
|---|---|---|---|
| 2017/0344855 A1* | 11/2017 | Mande | G06K 9/00785 |
| 2018/0095465 A1* | 4/2018 | Gao | G01C 21/34 |
| 2018/0231974 A1* | 8/2018 | Eggert | B60W 30/085 |
| 2018/0233049 A1* | 8/2018 | Ishii | G08G 1/04 |
| 2019/0339702 A1* | 11/2019 | Isele | G06N 3/006 |
| 2019/0369637 A1* | 12/2019 | Shalev-Shwartz | G06K 9/00791 |
| 2020/0097008 A1* | 3/2020 | Sadat | B60W 50/0097 |
| 2020/0110414 A1* | 4/2020 | Dupre | B60W 30/18154 |
| 2020/0192365 A1* | 6/2020 | Russell | G06K 9/00798 |

OTHER PUBLICATIONS

Isele, et al., "Navigating Occluded Intersections with Autonomous Vehicles Using Deep Reinforcement Learning", 2018 IEEE International Conference On Robotics and Automation (ICRA), IEEE, May 21, 2018, pp. 2034-2039.

PCT Search Report and Written Opinion dated May 12, 2020 for PCT Application No. PCT/US2020/012967, 15 pages.

* cited by examiner

US 11,188,082 B2

OCCLUSION PREDICTION AND TRAJECTORY EVALUATION

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may generate a plurality of potential routes for the autonomous vehicle to traverse in an environment, although selecting between such routes may present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
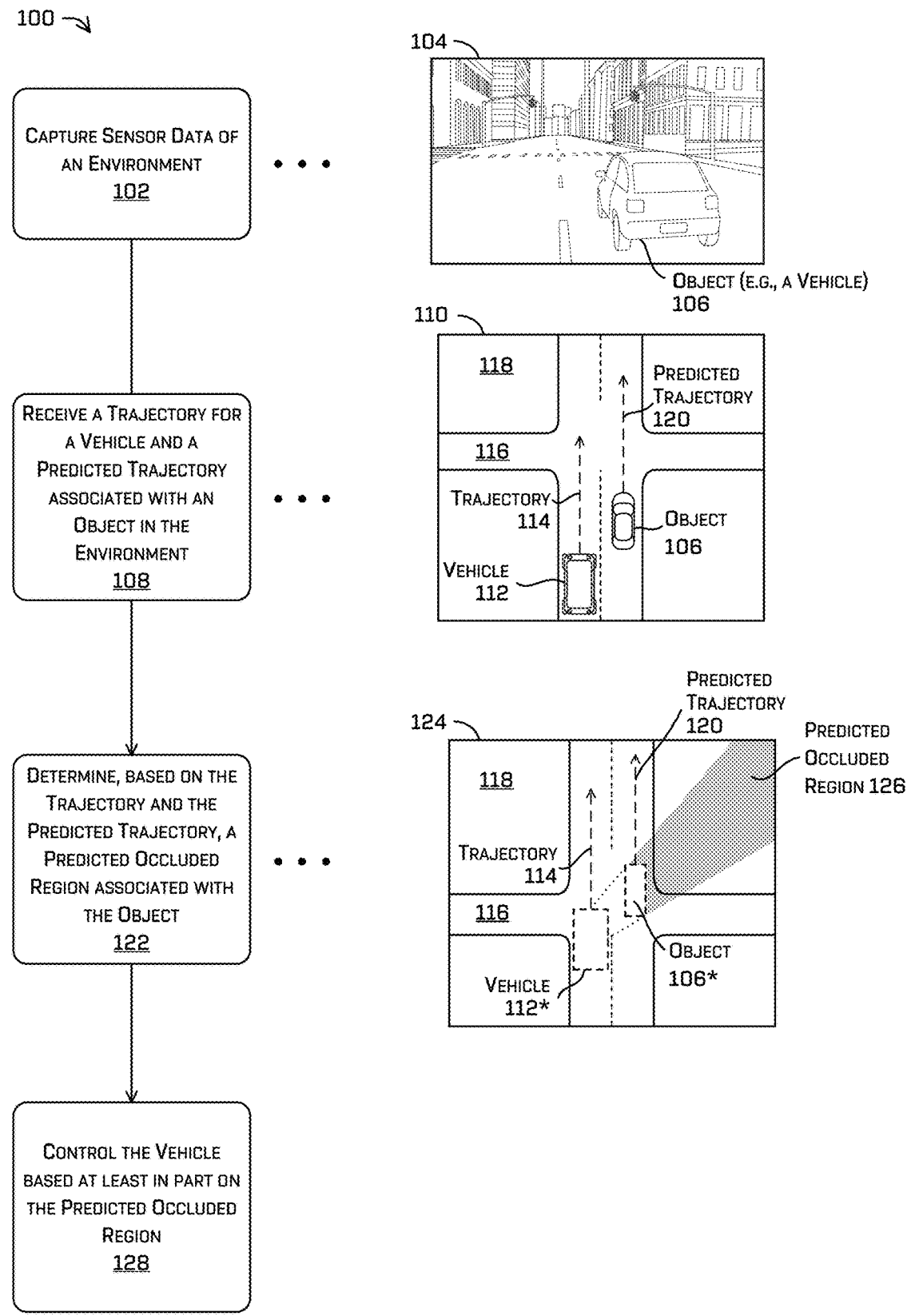
FIG. 1 is a pictorial flow diagram of an example process for capturing sensor data, receiving a trajectory for a vehicle and a predicted trajectory associated with an object in an environment, determining a predicted occluded region, and controlling the vehicle based at least in part on the predicted occluded region, in accordance with embodiments of the disclosure.

This disclosure is directed to evaluating trajectories based on predicted occluded regions associated with the trajectories, where the predicted occluded regions are determined with respect to predicted locations of objects in an environment. For example, sensors of a vehicle (such as an autonomous vehicle) can capture sensor data of an environment, which may include objects separate from the vehicle, such as other vehicles, pedestrians, buildings, vegetation, and so forth. Sensor coverage of the environment may be limited (occluded) based on obstructions in the environment. A planning system associated with the vehicle can generate trajectories for the vehicle to follow in the environment to navigate around such objects. An occlusion system associated with the vehicle can determine predicted occluded regions associated with objects based on the trajectories for the vehicle to follow in the environment and/or predicted trajectories associated with the detected objects.

For static objects (e.g., parked cars, buildings, etc.) the occlusion system can determine predicted occluded regions for various points along a vehicle trajectory. For dynamic objects (e.g., other vehicles in the environment), the occlusion system can receive predicted trajectories associated with the objects and can determine predicted occluded regions associated with the objects in an environment. The occlusion system can determine predicted occluded regions associated with a plurality of trajectories for the vehicle to follow in an environment. In some examples, the predicted occluded regions can be associated with various costs or occlusion scores, which may be based on a size of the predicted occluded region, an importance of an area occluded by the object along the particular trajectory being evaluated, and the like. Occlusion scores may be determined for a plurality of future times along the trajectory, and occlusion scores may be summed or aggregated to determine a trajectory score. The techniques can be performed in parallel to determine trajectory scores for a plurality of trajectories, and a trajectory may be selected from the plurality of trajectories based on the trajectory scores. The selected trajectory can be used to control the vehicle to traverse the environment.

Sensor data captured by the vehicle can include lidar data, radar data, image data, time of flight data, sonar data, and the like. In some cases, the sensor data can be provided to a perception system configured to determine a type of an object (e.g., vehicle, pedestrian, bicycle, animal, parked car, tree, building, and the like) in the environment. Further, the perception system can determine, based on the sensor data, movement information about the object in the environment. The sensor data and any data based on the sensor data can be represented in a top-down view (e.g., a top-down image having one or more channels) of the environment. For example, the image can represent the object as a two-dimensional bounding box representing the location of the object in the environment as well as an extent of the object (e.g., the length and width of the object), and/or a classification of the object (e.g., vehicle, pedestrian, and the like). In some examples, additional image channels may comprise velocities, accelerations, uncertainties associated therewith, and the like. Movement information such as velocity information can be represented as a velocity vector associated with the bounding box, although other representations are contemplated. Additionally, the image can represent, but is not limited to, one or more of: road network information (e.g., semantic labels indicating lanes, crosswalks, stop lines, lane dividers, stop signs, intersections, traffic lights, and the like); traffic light status (e.g., red light, yellow light, green light, etc.); a bounding box associated with the object, a velocity of the object in an x-direction, a y-direction, and/or a z-direction; an acceleration of the object in an x-direction and a y-direction; a blinker status of the object (e.g., left-turn, right-turn, braking, reverse, hazards, no lights, etc.); and the like.

The sensor data captured by the vehicle representing objects in the environment can be used to generate predicted occluded regions associated with the object in the environment relative to a particular trajectory of the vehicle. For example, the occlusion system can determine an occlusion grid associated with predicted occluded regions related to estimated locations of objects at future points in time. A location of the object can be evaluated over time to determine possible locations of the object based on the object classification, position, speed, acceleration, sensor uncertainty, and the like. Techniques such as ray casting can be used to determine which area(s) of the environment represented by the occlusion grid are occluded with respect to a location of the vehicle over time. In some examples, different techniques for determining occlusion can be used based on various sensor modalities. As a non-limiting example, ray casting may be used to determine occlusions for lidar sensors, whereas image projections using camera matrices may be used for determining occlusions of image sensors. The occlusion grid can be three-dimensional and can represent a prediction of the object in voxels that describe a volume of the object in the environment. Techniques for generating an occlusion grid can be found, for example, in U.S. patent application Ser. No. 16/011,436 titled "Occlusion Aware Planning" and filed Jun. 18, 2018, which is incorporated by reference herein in its entirety.

As the vehicle traverses an environment, the planning system can generate multiple possible trajectories that the vehicle may follow as time progresses. The trajectories, for instance, may include moving forward, backward, left, right, diagonally, stopping, accelerating, decelerating, or any combination of movement patterns to provide a safe and efficient ride for the passengers and/or cargo within the vehicle to otherwise reach a desired destination. The planning system can generate the multiple possible trajectories in parallel, can evaluate each trajectory for safety, efficiency, comfort, and/or other desired outcomes before selecting a trajectory for the vehicle to follow.

The occlusion system can provide the planning system with occlusion information to use in selecting a trajectory for the vehicle to follow through the environment. For example, the occlusion system can determine first predicted occluded region(s) caused by an object as the vehicle follows a first trajectory, where the first predicted occluded region(s) are based on predicted location(s) of the object relative to the vehicle as the vehicle follows the first trajectory. Similarly, and in some examples in parallel, the occlusion system can also determine second predicted occluded region(s) caused by the object as the vehicle follows a second trajectory that is different than the first trajectory. The second predicted occluded region(s) may also be based on predicted location(s) of the object relative to the vehicle, but as the vehicle follows the second trajectory.

To illustrate, consider a scenario in which a vehicle approaches an intersection where an object (e.g., a parked car) is blocking the vehicle from observing portion of the intersection where traffic may be oncoming. A first trajectory for the vehicle may be to wait at the intersection, and a second trajectory for the vehicle may be to creep forward into the intersection. The occlusion system can generate a predicted occluded region for the parked car while waiting at the intersection according to the first trajectory, and a predicted occluded region for the parked car associated with creeping forward along the second trajectory. Based at least in part on the predicted occluded regions for the first trajectory and the second trajectory, the vehicle can more efficiently select between the two trajectories (e.g., resulting in optimal visibility of the intersection).

The occlusion system may generate one or more occlusion scores for occlusions caused by various objects in the environment as the vehicle follows a trajectory. An occlusion score may be based on attributes associated with the occlusion, such as one or more of a combination of a percentage of the environment that is occluded by the object (and/or inversely a percentage of the environment which is not occluded), a visibility distance relative to the object (e.g., how close or far the object is from the vehicle), whether the occluded region obstructs a region of importance for the trajectory (e.g., if the occluded region comprises oncoming traffic information), with map data (e.g., representing a crosswalk, driveway, etc.), and the like. In some examples, the occlusion system can determine a trajectory score for the various possible trajectories that the vehicle may take, where the trajectory score represents an overall summation or aggregation of the occlusion scores of various predicted occluded regions in the environment. For example, the trajectory score may correspond to which trajectory or action on behalf of the vehicle will result in better (or worse) visibility for the vehicle. The occlusion system can output the trajectory scores associated with the one or more trajectories for the vehicle to the planning system, which may use the trajectory scores to select a trajectory for the vehicle to follow, along with other information supplied by additional vehicle systems for generating and selecting trajectories. In at least some examples, determination of a trajectory to follow may be based at least in part on one or more of a single occlusion score along a trajectory and/or the summation of all occlusion scores along the same trajectory.

The techniques discussed herein can improve a functioning of a computing device in a number of ways. For example, the occlusion system may forego generating predicted locations of objects and the associated occluded regions for regions determined to be unimportant to achieve the desired route, thus saving processing and computing resources in analyzing possible trajectories. In some cases, the dynamic nature of the described techniques (e.g., controlling the vehicle based in part on predicted occluded regions) require fewer rules to be enumerated for generating and/or selecting trajectories for vehicles such as autonomous vehicles. By controlling the vehicle based in part on predicted occluded regions, the safety of the vehicle can be improved by allowing the vehicle to adapt and react to its surroundings, rather than requiring the vehicle to follow set instructions, especially when a situation arises in which there is not a specific rule present. Further, controlling the vehicle based in part on predicted occluded regions can reduce processing resources, as the number of enumerated rules for every driving situation the vehicle may encounter would be virtually infinite. Accordingly, techniques for analyzing trajectories based on predicted occluded regions can be performed faster than conventional techniques, which may allow for a faster response or may allow a computing system to consider additional alternative trajectories, thereby improving safety outcomes, performance, and/or accuracy. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In another example, the techniques can be utilized in an aviation or nautical context, or in any system involving objects or entity that may be associated with behavior that is unknown to the system. Additionally, the techniques described herein can be used with real data (e.g., captured using sensor(s)), simulated data (e.g., generated by a simulator), or any combination of the two.

FIG. 1 is a pictorial flow diagram of an example process 100 for capturing sensor data, receiving a trajectory for a vehicle and a predicted trajectory associated with an object in an environment, determining a predicted occluded region associated with the object, and controlling the vehicle based at least in part on the predicted occluded region, in accordance with embodiments of the disclosure.

At operation 102, the process can include capturing sensor data of an environment. In some examples, the sensor data can be captured by one or more sensors on a vehicle (autonomous or otherwise). For example, the sensor data can include data captured by one or more of a lidar sensor, a radar sensor, an image sensor, a time of flight sensor, a sonar sensor, and the like.

An example illustrates image data 104 captured in the operation 102. For example, the image data 104 can represent an object 106 in the environment. In some examples, the object 106 can represent a vehicle, a pedestrian, an animal, and the like. In some instances, the sensor data captured in the operation 102 can be used to determine information about the object 106, including but not limited to, a type of the object (e.g., semantic information indicating a classification of the object, such as a vehicle, pedestrian, bicycle, animal, and the like). In some instances, the operations can include determining the type of the object 106, a bounding box associated with the object 106, segmentation information associated with the object 106, and/or movement information associated with the object, and any uncertainties associated therewith, as discussed herein.

At operation 108, the process can include receiving a trajectory for a vehicle and receiving a predicted trajectory associated with an object in the environment. An example 110 illustrates a vehicle 112 associated with a trajectory 114, whereby the trajectory 114 represents a path for the vehicle to follow in the environment. In some examples, the trajectory 114 can represent a centerline of a road segment. In some examples, the trajectory 114 can represent controls associated with the vehicle 112. For examples, the controls can include, but are not limited to, steering angles and/or accelerations over time. Of course, the trajectory 114 can represent other data, depending on various implementations.

For the purpose of discussion, the vehicle 112 capturing (or utilizing) the sensor data can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 112 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 112 are described throughout this disclosure.

The object 106 is also located in the environment, as shown in the illustrated example 110. In some examples, the object 106 can represent a vehicle, a pedestrian, a bicycle, an animal, and the like. The environment illustrated in the example 110 can include a drivable region 116 and a non-drivable region 118. In some examples, the drivable region 116 can include any area of an environment where the vehicle 112 can (legally) traverse (e.g., a road, a driveway, a parking lot, etc.). In some examples, the non-drivable region 118 can represent areas of an environment where the vehicle 112 cannot legally or physically traverse (e.g., a sidewalk, a building, a park, etc.).

In some examples, the trajectories received in the operation 108 can be based at least in part on localizing the vehicle 112 in the environment and accessing map data associated with the environment. For example, map data can comprise map elements such as lane elements indicating a region of the environment corresponding to the drivable region 116. Additional examples of map elements can include, but are not limited to, one or more of a building or structure, a crosswalk element, a bike lane element, an intersection element, a lane divider element, a traffic light element, a stop sign element, a stop line element, a yield sign element, a yield line element, a parking lane element, a driveway element, a speed bump element, jay walking regions (e.g., a virtual crosswalk), trajectory waypoints (e.g., known trajectories), passenger pickup points, a sign location element, a geofence element, and the like. In some cases, a predicted trajectory associated with an object can be based on the map data.

In some examples, the trajectories received in the operation 108 can be based on determining predicted trajectories for objects in the environment, such as a predicted trajectory 120 associated with the object 106 moving through the environment. The predicted trajectory 120 can be determined, for example, using a discretized probability distribution (e.g., a probability map, a discretized prediction probability map, a heat map, and the like) that represents prediction probabilities indicative of a probability that the object 106 will be at a corresponding location in the environment at the time corresponding to a respective discretized probability distribution. Examples of generating one or more discretized probability distributions are discussed in U.S. patent application Ser. No. 16/206,877 filed Nov. 30, 2018, which is incorporated by reference herein in its entirety.

At operation 122, the process can include determining, based on the trajectory and the predicted trajectory, a predicted occluded region associated with the object. An example 124 illustrates determining a predicted occluded region 126 with respect to the trajectory 114 of the vehicle 112, and with respect to the predicted trajectory 120 of the object 106. For example, a region of the vehicle 112 at a time in the future along the trajectory 114 can be represented as a region 112*. In some examples, a size of the region 112* can be based at least in part on a size of the vehicle 112, a velocity of the vehicle 112, a location in the environment, a type of objects in an environment, a safety factor associated with the vehicle 112, and the like. Similarly, a region of the object 106 at a time in the future along the predicted trajectory 120 can be represented as a region 106*, where a size of the region 106* can be based at least in part on a size of the object 106, a predicted velocity of the object 106, a predicted location in the environment, a type of the object 106 and other objects in an environment, and the like.

In some examples, the predicted occluded region 126 represents a portion of the environment which may be blocked by the object 106, thus preventing various sensors of the vehicle 112 from obtaining information about the environment. In some examples, the predicted occluded region 126 can be determined using ray casting techniques. For example, a ray can be projected from a point associated with the vehicle 112* to determine regions of the environment that are observable by one or more sensors of the vehicle 112*. Regions that are not observable to one or more sensors of the vehicle 112* can be represented as the predicted occluded region 126. In some examples, region(s) of the environment (or an occlusion grid) can be associated with metadata indicating a state of region, such as whether the region represents free space, is occupied by an object in the environment, represents an occluded region, is unknown, and the like.

Although generally depicted as being in an x-direction and a y-direction for clarity in the example 124, the predicted occluded region 126 may also represent occlusion information associated with a z-direction component, which may correspond to a height of the object 106, for instance. In another example, occlusion information may be associated with a z-direction component corresponding to terrain of the surrounding environment, such as hills or valleys, or height of objects that may be occluded but are relevant to trajectory determinations, such as stop lights or train crossing signals.

In some examples, the operation 122 can include determining an occlusion score for the predicted occluded region 126. For instance, an occlusion score can be based on one or more aspects or attributes of the predicted occluded region 126, where the occlusion score may be associated with a size of the predicted occluded region, an importance of an area occluded by the object along the particular trajectory being evaluated, map data, and the like. The occlusion score(s) for discrete regions (e.g., an individual occlusion field of an occlusion grid) of the predicted occluded region 126 can be summed to determine an overall occlusion score for the predicted occluded region 126. Further, as discussed throughout the disclosure, occlusion scores may be determined for a plurality of future times along the trajectory 114, and occlusion scores may be summed or aggregated to determine a trajectory score for the trajectory 114. Additionally, as time passes, the occlusion scores (and thus the trajectory scores) may be revised or otherwise updated as objects maintain or change trajectories and the environment surrounding the vehicle 112 changes.

At operation 128, the process can include controlling the vehicle based at least in part on the predicted occluded region. For example, the trajectory scores for multiple possible trajectories can be compared to select a trajectory, which can be used to control the vehicle 112 to traverse the environment. The selected trajectory can be based on a highest trajectory score of the multiple trajectory scores, a lowest trajectory score of the multiple trajectory scores, a median trajectory score of the multiple trajectory scores, or any suitable selection. In at least some examples, a trajectory may be chosen to optimize the amount of data in an environment so as to ensure safe traversal by the vehicle.

While the trajectory scores can be used in various ways to select the trajectory for a vehicle, other inputs may also contribute to selecting a trajectory and/or controlling the vehicle (e.g., safety systems, user inputs, and so forth). For example, in some examples, a trajectory score can be used as one of many costs associated with evaluating a trajectory. Examples of additional costs used to evaluate a trajectory can include, but are not limited to, one or more of a reference cost (e.g., a cost based on a distance between a reference trajectory and a candidate trajectory in the environment), an obstacle cost (e.g., a cost based on a distance between a reference trajectory and/or a candidate trajectory and an obstacle in the environment), a steering cost (e.g., a cost based on steering angles for the vehicle), an acceleration cost (e.g., a cost based on a maximum acceleration for the vehicle), and the like.

Additional details of predicted trajectories, predicted occluded regions, occlusion scores, and trajectory scores are discussed throughout this disclosure.

Figure 2:
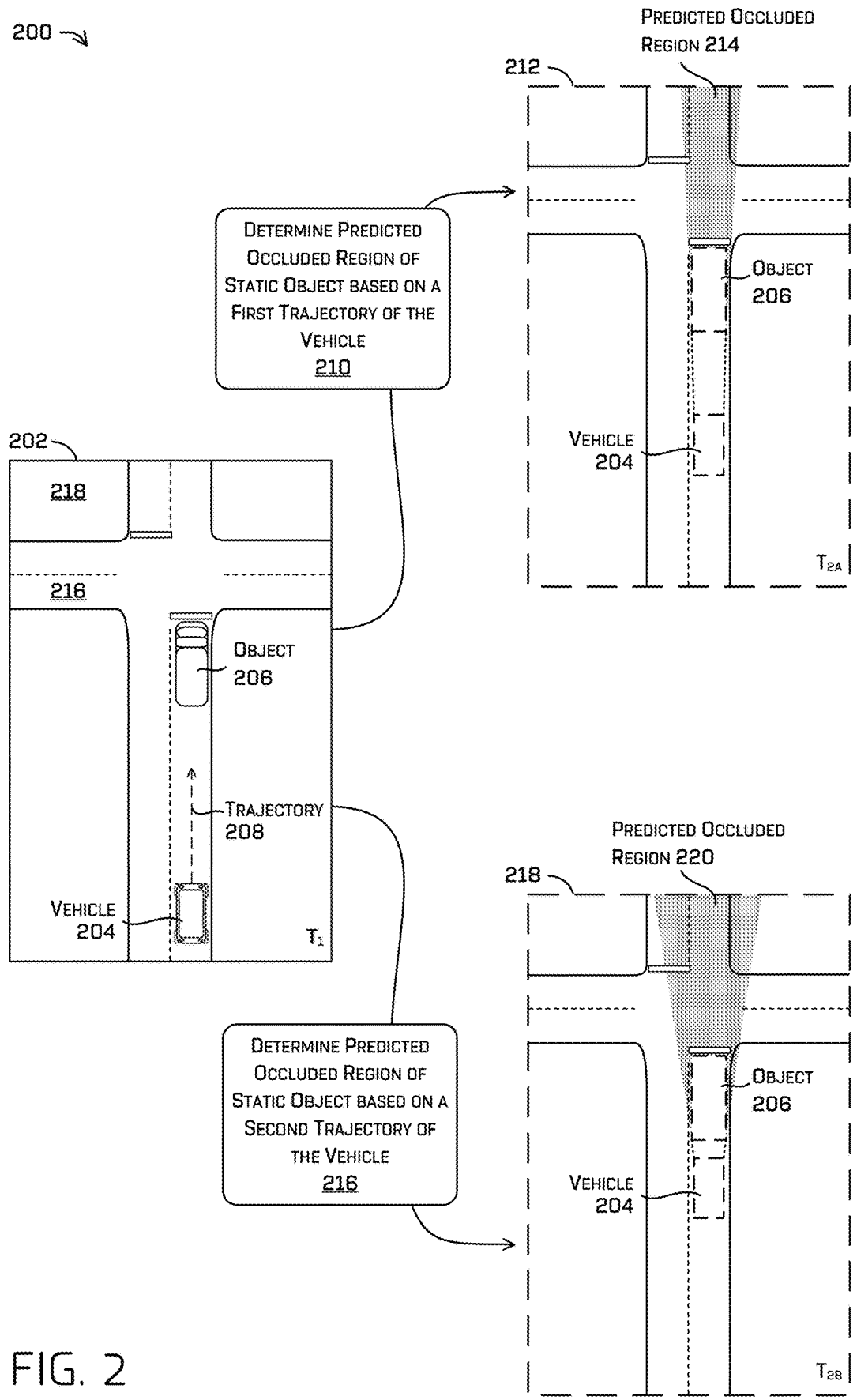
FIG. 2 is an example of evaluating trajectories of a vehicle based on predicted occluded regions associated with a static object, in accordance with embodiments of the disclosure.

FIG. 2 is an example 200 of evaluating trajectories of a vehicle based on predicted occluded regions associated with a static object, in accordance with embodiments of the disclosure.

An environment 202 includes a vehicle 204 (e.g., an autonomous vehicle) and an object 206 (e.g., another vehicle). In some examples, a planning system of the vehicle 204 may evaluate a trajectory 208 with respect to a predicted location of the object 206 over time, as discussed herein. As illustrated, the environment 202 may represent an initial time (e.g., $T_1$).

In some examples, a planning system of the vehicle 204 may determine predicted occluded regions associated with the object 206 for multiple possible trajectories that the vehicle 204 may choose to follow. For instance, the planning system of the vehicle 204 may generate an occlusion grid associated with predicted occluded regions related to estimated locations of objects at future points in time. An occlusion grid can include a plurality of occlusion fields, which can represent discrete areas of an environment, such as drivable surfaces. In some examples, an occlusion field can indicate an occlusion state (e.g., indicating whether the location is visible to one or more sensors of an autonomous vehicle) and an occupancy state (e.g., indicating whether the location is occupied by an object such as a vehicle, pedestrian, animal, etc.). An occlusion grid can be generated from map data of the environment, and the planning system can use data from sensors of the vehicle to determine the states of the occlusion fields. In some examples, the planning system can use ray casting techniques, or otherwise, to determine the occlusion states associated with the occlusion grid. Further, in some examples, the planning system of the vehicle 204 can identify and segment image data into semantic categories, including but not limited to, a drivable surface, free space (e.g., drivable surfaces) and/or non-free space, a vehicle, a pedestrian, a building, vegetation, and the like. The planning system may also include functionality to receive segmented image data and map data including the occlusion grid and occlusion field(s), and to project the occlusion field(s) into the segmented image data. In some instances, the planning system can determine an occupancy of the one or more occlusion fields by determining whether the occlusion field projects into a drivable surface (e.g., a clear road), into an object (e.g., a vehicle that would occupy the region), or otherwise indeterminate.

A location of the object 206 can be evaluated over time to determine possible future locations of the object 206 based on the object classification, position, speed, acceleration, sensor uncertainty, and the like. In the example 200, the planning system can determine that the object 206 is a static object through time $T_1$, and can predict with a degree of certainty that the object 206 will remain static (e.g., relatively stationary) through a future time $T_2$. For example, the object 206 may be a vehicle at a stop light or stop sign such that the vehicle 204 can determine (e.g., based on image data and/or map data) that the object 206 will remain stationary, at least for a period of time.

At operation 210, the planning system (and/or the occlusion system) of the vehicle 204 can determine a predicted occluded region of a static object (e.g., object 206) based on a first trajectory of the vehicle 204. A predicted environment 212 illustrates the vehicle 204 and the object 206 at a future time (e.g., at $T_{2A}$, a time after $T_1$), where the vehicle 204 follows a first trajectory. Based on the determination that the object 206 will remain static through a future time $T_{2A}$, the planning system can generate an occlusion grid for the future time $T_{2A}$ based on the first trajectory of the vehicle 204. The occlusion grid generated for the predicted environment 212 can include an indication of an occlusion state and an occupancy state based on the location of the object 206. Further, the planning system can use map data associated with the predicted environment 212 to determine portions of the predicted environment that are occluded by the object 206.

As shown in the predicted environment 212, the first trajectory of the vehicle 204 causes the vehicle to stop with a great deal of space between the vehicle 204 and the object 206. As a result, more visibility is available to the vehicle 204, as indicated by a relatively small predicted occluded region 214.

At operation 216, the planning system of the vehicle 204 can determine a predicted occluded region of the static object (e.g., the object 206) based on a second trajectory of the vehicle 204. In some examples, the planning system of the vehicle 204 can determine the predicted occluded regions for the first trajectory and the second trajectory (or any number of possible trajectories) in parallel, before determining or otherwise selecting which trajectory to traverse through the environment. A predicted environment 218 illustrates the vehicle 204 and the object 206 at a future time (e.g., at $T_{2B}$, a time after $T_1$), where the vehicle 204 follows a second trajectory that is different than the first trajectory. The times $T_{2A}$ and $T_{2B}$ may be substantially the same time in the future, such that the planning system of the vehicle 204 can compare how the different trajectories will likely affect the predicted occluded regions in the environment.

Similar to the discussion above, the planning system can generate an occlusion grid for the future time $T_{2B}$ based on the second trajectory of the vehicle 204 and based on the determination that the object 206 will remain static through the future time $T_{2B}$. The occlusion grid generated for the predicted environment 218 also can include an indication of an occlusion state and an occupancy state based on the location of the object 206. Further, the planning system can use map data associated with the predicted environment 218 to determine portions and/or attributes of the predicted environment that are occluded by the object 206.

However, as shown in the predicted environment 218, the second trajectory of the vehicle 204 results in the vehicle stopping closer to the object 206, relative to the predicted environment 212. As a result, less visibility is available to the vehicle 204, as indicated by a relatively large predicted occluded region 220, relative to the predicted environment 212. Of course, though depicted for illustrative purposes as two evaluations, multiple points along each trajectory may be determined and summed (or otherwise combined) in order to determine an occlusion score and/or a trajectory score associated therewith.

Figure 3:
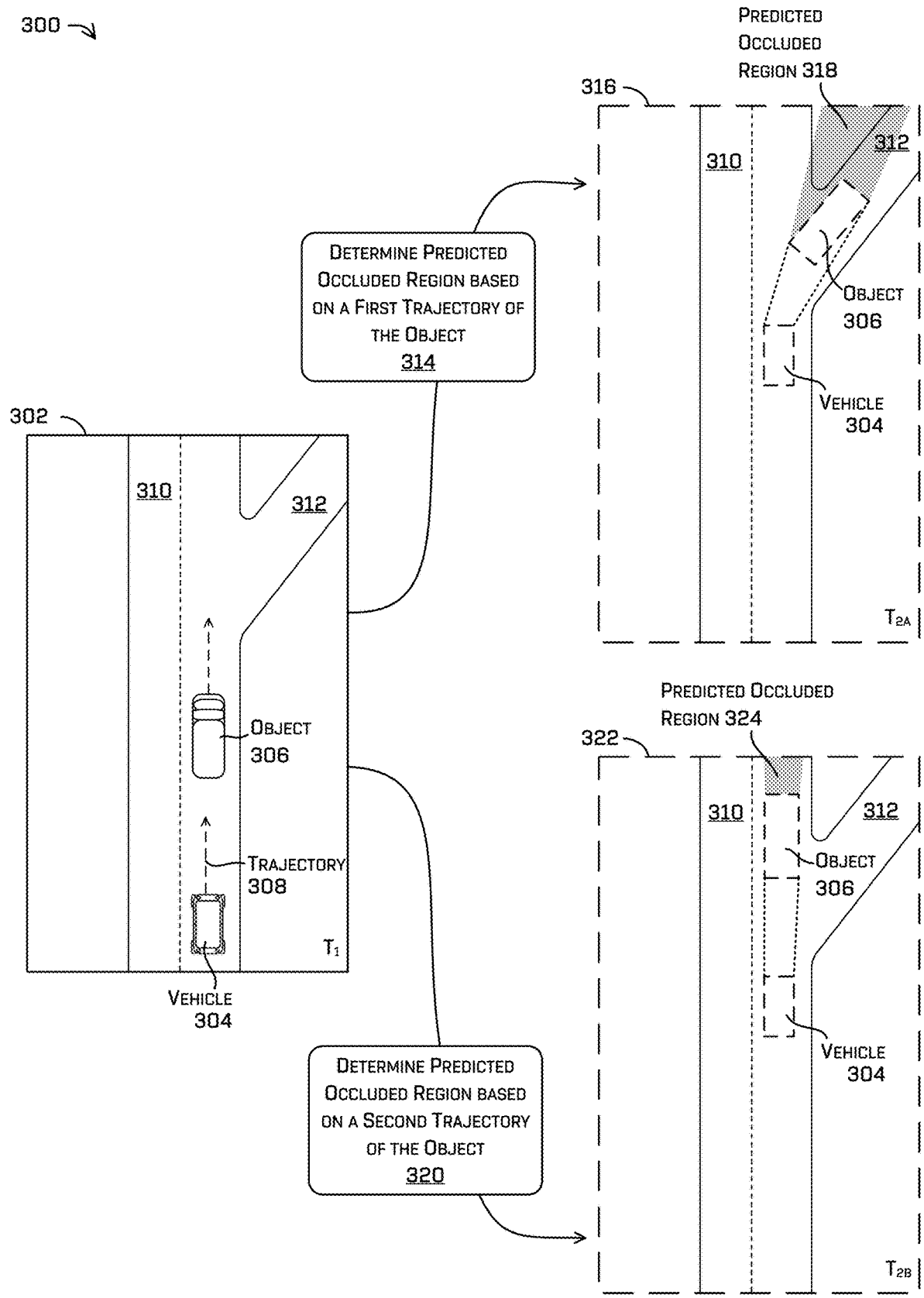
FIG. 3 is an example of evaluating a trajectory of a vehicle based on predicted occluded regions associated with trajectories of a dynamic object, in accordance with embodiments of the disclosure.

FIG. 3 is an example 300 of evaluating a trajectory of a vehicle based on predicted occluded regions associated with trajectories of a dynamic object, in accordance with embodiments of the disclosure.

An environment 302 includes a vehicle 304 and an object 306. In some examples, a planning system and/or occlusion system of the vehicle 304 may evaluate a trajectory 308 with respect to a predicted location of the object 306 over time. As illustrated, the environment 302 may represent an initial time (e.g., $T_1$). Further, the environment 302 includes two connected drivable surfaces, a first drivable surface 310 (e.g., a highway, freeway, or an arterial route, to name a few examples) and a second drivable surface 312 (e.g., an exit or side road, for instance).

A location of the object 306 can be evaluated over time to determine possible future locations of the object 306 based on the object classification, position, speed, acceleration, sensor uncertainty, and the like. In the example 300, the planning system can determine that the object 306 is a dynamic object through time $T_1$, such as based on a changing position of the object 306 as the object 306 traverses the drivable surface 310, a speed of the object 306 as the object 306 traverses the drivable surface 310, and so forth.

In some examples, the planning system and/or occlusion system of the vehicle 304 can determine (e.g., continuously as the vehicle 304 traverses the environment 302) predicted locations of the object 306. For instance, the planning system of the vehicle 304 can generate a discretized probability distribution representing possible locations of the object 306 in the environment over time. For example, the planning system can determine a covariance matrix associated with an uncertainty of the object 306 at an initial state or time (e.g., $T_1$). The covariance matrix can include a variance with respect to a longitudinal, lateral, and/or vertical position in the environment. As a location of the object 306 is evaluated over time (e.g., at a future time $T_2$), the covariance matrix can be evaluated as well to determine a covariance matrix associated with position(s) of the object 306 in the future. Other techniques for representing possible locations of the object 306 are considered, such as physics-based modeling, which may include determining a velocity and/or type of object, map data, and the like, and determining a predicted trajectory of the object.

In the example 300, the planning system of the vehicle 304 can determine that there is a first probability that the object 306 will exit from the drivable surface 310 onto the drivable surface 312, and a second probability that the object 306 will continue on the drivable surface 310. In some examples, the planning system can generate one or more discretized probability distributions or heat maps including prediction probabilities associated with possible locations of the object 306 in the environment. A discretized probability distribution can be generated to represent any point or period of time in the future, such as 1 second, 2 seconds, 5 seconds, etc. in the future. Further, such a discretized probability distribution can represent prediction probabilities associated with a single object or can represent aggregated prediction probabilities associated with a plurality of objects. Predicted trajectories associated with the object 306 can be determined based at least in part on such discretized probability distributions or heat maps. While discretized probability distributions are described as one possible example, any suitable technique for predicting locations and/or trajectories of objects, and probabilities associated therewith, may be used.

In some cases, the planning system of the vehicle 304 can represent possible locations of the object 306 in the future based on covariance matrices can be represented as Gaussian distributions that can be discretized into cells or portions of the environment proximate to the object or proximate to the vehicle. For example, a discretized probability distribution can represent a 64×64 grid (or J×K sized grid) representing a 100 meter by 100 meter region around the vehicle 304. Of course, the discretized probability map can represent any size of region and can represent any number of discrete portions of the region. That is, the discretized probability map can represent an environment at any level of resolution. In some cases, a portion of the discretized probability map can be referred to as a cell of the discretized probability map. Each cell can comprise a prediction probability representing a probability that the object 306 will be at the corresponding location in the environment at the time corresponding to the discretized probability map. In some instances, a machine learning model can output a plurality of discretized probability maps, wherein a discretized probability map of the plurality of discretized probability maps can represent prediction probabilities associated with the object at a particular time in the future (e.g., 0.5 second, 1 second, 3 seconds, 5 seconds, 10 seconds, etc.). Though described in terms of discretized probability distributions, the predicted trajectory need not be so limiting. Other models (e.g., machine learned models) may generally output one or more predicted trajectories associated with the object and/or probabilities associated therewith.

In the illustrated example 300, the first probability and the second probability may be above a threshold probability, which can cause the planning system of the vehicle to evaluate predicted occluded regions caused by the object 306 for both predicted locations of the object.

For example, at operation 314, the planning system of the vehicle 304 can determine a predicted occluded region based on a first trajectory of an object (e.g., object 306). A predicted environment 316 illustrates the vehicle 304 and the object 306 at a future time (e.g., at $T_{2A}$, a time after $T_1$), where the object 306 follows a first trajectory. Based on the determination that the object 306 will exit from the drivable surface 310 onto the drivable surface 312 at a future time $T_{2A}$, the planning system can generate an occlusion grid for the future time $T_{2A}$ based on the first trajectory of the object 306. The occlusion grid generated for the predicted environment 316 can include an indication of an occlusion state and an occupancy state based on the location of the object 306 and/or free space, etc. Further, the planning system can use map data associated with the predicted environment 316 to determine portions of the predicted environment that are occluded by the object 306. The planning system determines a predicted occluded region 318 based on the occlusion grid and the map data (which may also be used to determine importance of the occluded region), and can use the predicted occluded region 318 to control the vehicle as described above and below.

At operation 320, the planning system of the vehicle 304 can determine a predicted occluded region based on a second trajectory of the object (e.g., object 306). In some examples, the planning system of the vehicle 304 can determine the predicted occluded regions for the first trajectory and the second trajectory (or any number of possible trajectories) of the object 306 in parallel. A predicted environment 322 illustrates the vehicle 304 and the object 306 at a future time (e.g., at $T_{2B}$, a time after $T_1$), where the object 306 follows a second, different trajectory than the first trajectory. The times $T_{2A}$ and $T_{2B}$ may be substantially the same time in the future, such that the planning system of the vehicle 304 can compare how the different predicted trajectories of the object 306 will likely affect the occluded regions in the environment.

Based on the determination that the object 306 will remain on the drivable surface 312 at the future time $T_{2B}$, the planning system can generate an occlusion grid for the future time $T_{2B}$ based on the second trajectory of the object 306. The occlusion grid generated for the predicted environment 322 can include an indication of an occlusion state and an occupancy state based on the location of the object 306. Further, the planning system can use map data associated with the predicted environment 322 to determine portions of the predicted environment that are occluded by the object 306 (and/or determine a level of importance of the occluded region). The planning system determines a predicted occluded region 324 based on the occlusion grid and the map data, and can use the predicted occluded region 324 to control the vehicle as described above and below. Of course, though depicted for illustrative purposes as two evaluations, multiple points along each trajectory may be determined and summed (or otherwise combined) in order to determine an occlusion score and/or a trajectory score associated therewith.

Figure 4:
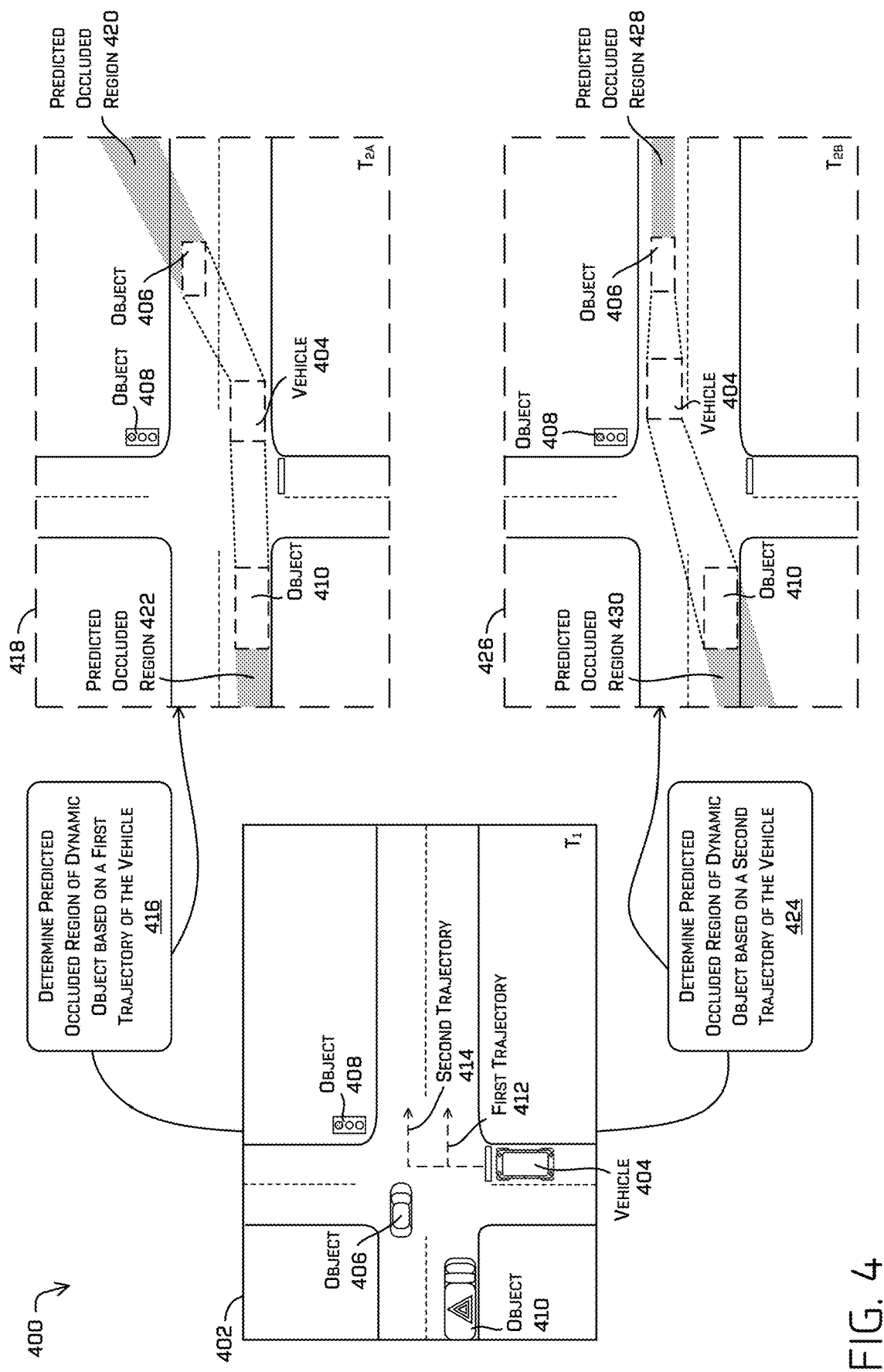
FIG. 4 is an example of evaluating multiple trajectories of a vehicle based on predicted occluded region(s) associated with a dynamic object, in accordance with embodiments of the disclosure.

FIG. 4 is an example 400 of evaluating multiple trajectories of a vehicle based on predicted occluded region(s) associated with a dynamic object, in accordance with embodiments of the disclosure.

An environment 402 includes a vehicle 404, an object 406 (e.g., another vehicle), an object 408 (e.g., a stoplight), and an object 410 (e.g., a double-parked vehicle (DPV)). In some examples, a planning system of the vehicle 404 may evaluate a first trajectory 412 and a second trajectory 414 with respect to a predicted location of the object 406 over time. As illustrated, the environment 402 may represent an initial time (e.g., $T_1$), at which the vehicle 404 intends to make a right turn at a red light represented by the object 408. The first trajectory 412 and the second trajectory 414 correspond to different lanes of a drivable surface that the vehicle 404 can turn into.

As discussed above, a location of the object 406 can be evaluated over time to determine possible future locations of the object based on the object classification, position, speed, acceleration, sensor uncertainty, and the like. In the example 400, the planning system can determine that the object 406 is a dynamic object through time $T_1$ based on, for example, a changing position of the object 406 as the object traverses the environment, a speed of the object 406 as the object traverses the environment, and so forth. Additionally, the planning system of the vehicle 404 can determine that the object 408 is a stoplight with a red-light indication, such as based on object classification. Using this information, the planning system can determine that there is a high probability that the object 406 will continue through the intersection while the stop light remains red. Further, the planning system of the vehicle 404 can use this information to determine predicted occluded regions for the first trajectory 412 and the second trajectory 414, and evaluate which trajectory to select for the vehicle to follow based on the predicted occluded regions caused by the object 406.

For example, at operation 416, the planning system of the vehicle 404 determines a predicted occluded region of a dynamic object (e.g., the object 406) based on the first trajectory 412 of the vehicle 404. A predicted environment 418 illustrates the vehicle 404, the object 406, the object 408, and the object 410 at a future time (e.g., at $T_{2A}$, a time after $T_1$), where the vehicle 404 follows the first trajectory 412. The planning system of the vehicle 404 can generate an occlusion grid for the future time $T_{2A}$ based on the first trajectory 412 of the vehicle 404, a predicted trajectory of the object 406, and a predicted location of the object 410. The occlusion grid generated for the predicted environment 418 can include an indication of an occlusion state and an occupancy state based on the locations of the object 406 and the object 410. Further, the planning system can use map data associated with the predicted environment 418 to determine portions of the predicted environment that are occluded by the object 406 and the object 410 (and/or an importance associated therewith) as the vehicle 404 follows the first trajectory 412. For instance, map data associated with the predicted environment 418 may indicate that it may be possible for traffic to come from a direction behind the object 410, and may not be visible regardless of a trajectory selected by the vehicle 404. In some cases, the map data may provide insight to other potential hazards which may be considered as a result of the location of the object 410, such as a delivery driver accessing a building near the object 410 to make a delivery, a bicyclist traversing the narrow area between the object 410 and a sidewalk, and so forth. These considerations may increase (or decrease) an importance associated with different regions of the predicted environment 418 when selecting a trajectory for the vehicle 404 to follow in the environment.

The planning system determines a predicted occluded region 420 based on the occlusion grid and the map data corresponding to the predicted location of the object 406, and a predicted occluded region 422 corresponding to the predicted location of the object 410. The planning system can use the predicted occluded region 420 and the predicted occluded region 422 to generate one or more occlusion scores for the predicted occluded region 420 and/or the predicted occluded region 422. In some examples, an occlusion score can be based on a size of the predicted occluded region 420 and/or 422, an importance of an area occluded by the object 406 and/or the object 410 along the trajectory 412, map data, and the like. For example, an object may occlude a relatively large area from view of a vehicle, but if the area is of little importance to controlling the vehicle (e.g., the area is behind a direction of travel), the occlusion score may be low. In other cases, however, an object may occlude a relatively small area from view of the vehicle, but the area may be of high importance to controlling the vehicle (e.g., the area is an on-ramp in front of the vehicle with rapidly approaching oncoming traffic, the occluded area comprises a driveway or crosswalk, etc.), causing the occlusion score to be relatively high. Of course, examples are contemplated in which a large occluded area receives a high occlusion score, and a small occluded area receives a low occlusion score. Further, in some instances, a region may be occluded regardless of a potential trajectory of the vehicle 404, also referred to as "permanently occluded." When a region is determined to be permanently occluded, a planning system may control the vehicle 404 accordingly, such as by increasing or decreasing speed, applying a signal (e.g., a blinker or other signal) to notify surrounding traffic and/or pedestrians of upcoming actions to be taken by the vehicle, and so forth. In at least some examples, such permanently occluded areas may be taken into account when determining an occlusion score and/or a trajectory score. As a non-limiting example, a permanently occluded area may provide a minimum bound over all possible occlusion and/or trajectory scores, as it would not be possible to plan an alternate trajectory to further minimize it.

At operation 424, the planning system of the vehicle 404 determines a predicted occluded region of the dynamic object (e.g., the object 406) based on the second trajectory 414 of the vehicle 404. In some examples, the planning system of the vehicle 404 can determine the predicted occluded regions for the first trajectory 412 and the second trajectory 414 (or any number of possible trajectories) of the vehicle 404 in parallel. A predicted environment 426 illustrates the vehicle 404, the object 406, the object 408, and the object 410 at a future time (e.g., at $T_{2B}$, a time after $T_1$), where the vehicle 404 follows the second trajectory 414 that is different than the first trajectory 412. The times $T_{2A}$ and $T_{2B}$ may be substantially the same time in the future, such that the planning system of the vehicle 404 can compare how the different trajectories 412 and 414 of the vehicle 404 will likely affect the occluded regions in the environment.

The planning system of the vehicle 404 can generate an occlusion grid for the future time $T_{2B}$ based on the second trajectory 414 of the vehicle 404, a predicted trajectory of the object 406, and a predicted location of the object 410. The occlusion grid generated for the predicted environment 426 can include an indication of an occlusion state and an occupancy state based on the locations of the object 406 and the object 410. Further, the planning system can use map data associated with the predicted environment 426 to determine portions of the predicted environment that are occluded by the object 406 and/or the object 410 (and/or determine an importance associated therewith) as the vehicle 404 follows the second trajectory 414. The planning system determines a predicted occluded region 428 corresponding to the predicted location of the object 406, and a predicted occluded region 430 corresponding to the predicted location of the object 410, based on the occlusion grid and the map data. The planning system can use the predicted occluded region 428 and/or the predicted occluded region 430 to generate one or more occlusion scores for the predicted occluded region 428 and/or the predicted occluded region 430. In some examples, the occlusion score(s) can be based on a size of the predicted occluded region 428 and/or 430, an importance of an area occluded by the object 406 and/or the object 410 along the trajectory 414, map data, sensed data, and the like.

In some examples, the planning system of the vehicle 404 can compare one or more of the occlusion scores for the first trajectory 412 to the occlusion score(s) for the second trajectory 414, and select between the trajectories based on the occlusion scores for the respective trajectories. For instance, the predicted occluded region 420 may receive a low occlusion score based on an importance of the area occluded by the object 406, despite having a larger area than the predicted occluded region 428. Additionally, the predicted occluded region 428 may receive a high occlusion score based on an importance of the area occluded by the object 406, despite having a smaller area than the predicted occluded region 420. Therefore, based on the analysis of the predicted occluded region 420 and the predicted occluded region 428, the planning system of the vehicle 404 can control the vehicle 404 to traverse the environment following the first trajectory 412.

The planning system of the vehicle 404 may also consider the predicted occluded region 422 and the predicted occluded region 430 when selecting the first trajectory 412 or the second trajectory 414 for the vehicle 404 to traverse the environment. The predicted occluded region 422 and the predicted occluded region 430 at least partially overlap, resulting in a region of the environment that is permanently occluded. In other words, regardless of whether the vehicle 404 follows the first trajectory 412 or the second trajectory 414, an area behind the object 410 will be occluded. Based on map data, the planning system of the vehicle 404 can determine that oncoming traffic is possible behind the object 410, and may use this information in selecting the first trajectory 412 or the second trajectory 414. For instance, the planning system of the vehicle 404 may determine that the first trajectory is safer for the vehicle 404 to follow, based on a determination that occluded vehicles in oncoming traffic are more likely to follow the route of the object 406 and stay in the lane unoccupied by the object 410, at least through the intersection of traffic. Of course, though depicted for illustrative purposes as two evaluations, multiple points along each trajectory may be determined and summed (or otherwise combined) in order to determine an occlusion score and/or a trajectory score associated therewith.

Figure 5A:
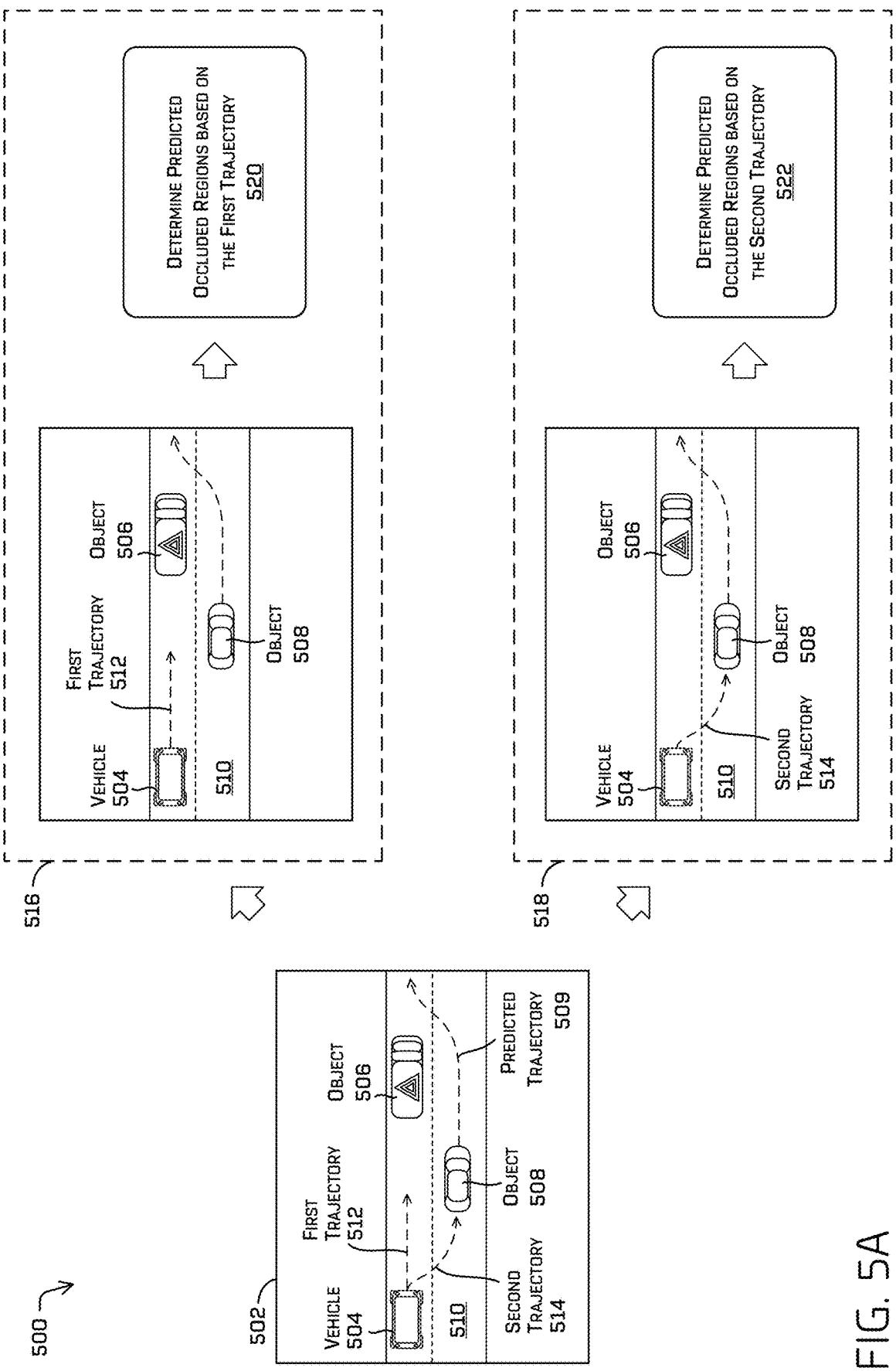
FIG. 5A is an overview of the examples presented in FIGS. 5B and 5C.
Figure 5B:
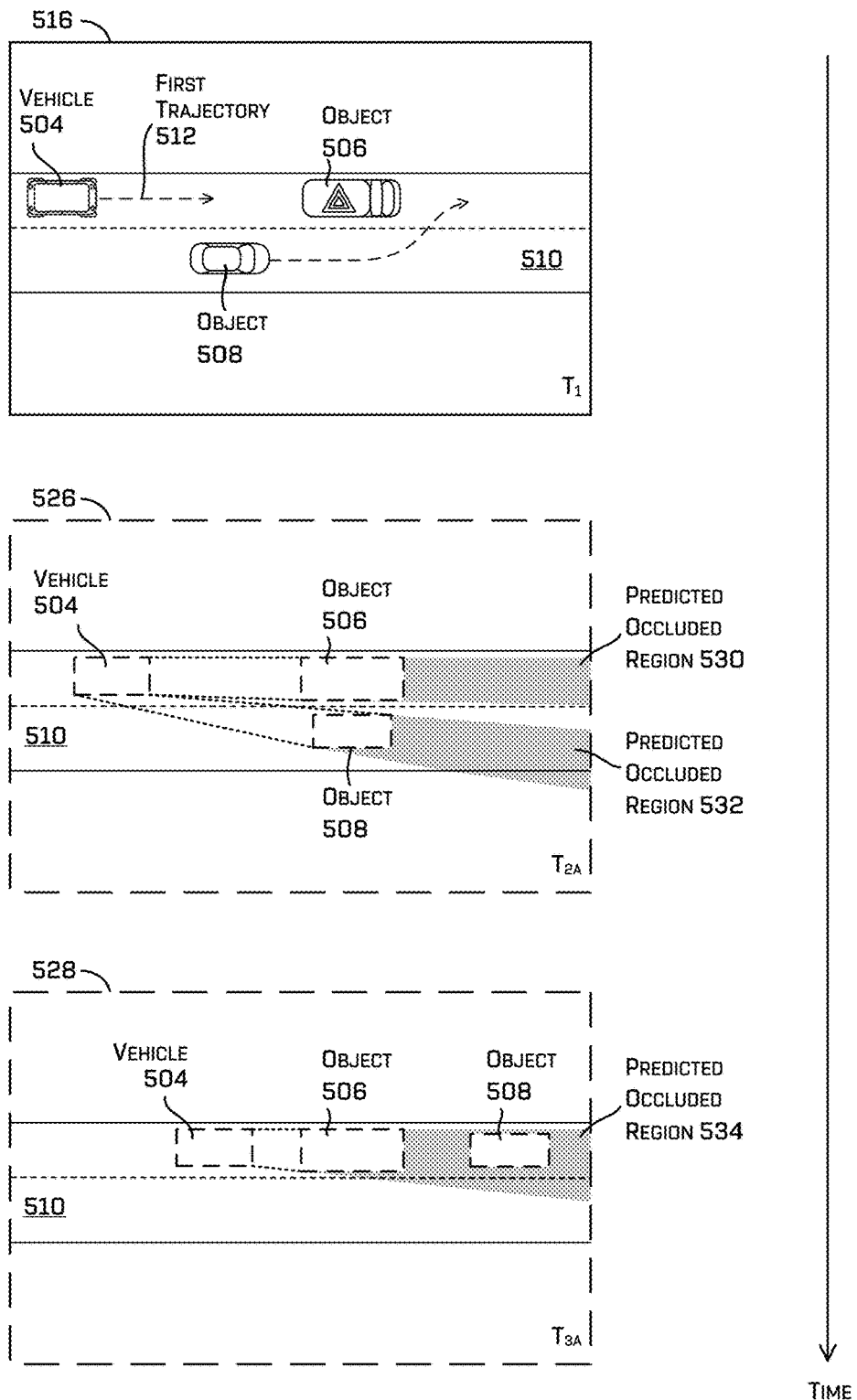
FIG. 5B is an example of evaluating a first trajectory of a vehicle based on predicted occluded region(s) associated with object(s) over time, in accordance with embodiments of the disclosure.
Figure 5C:
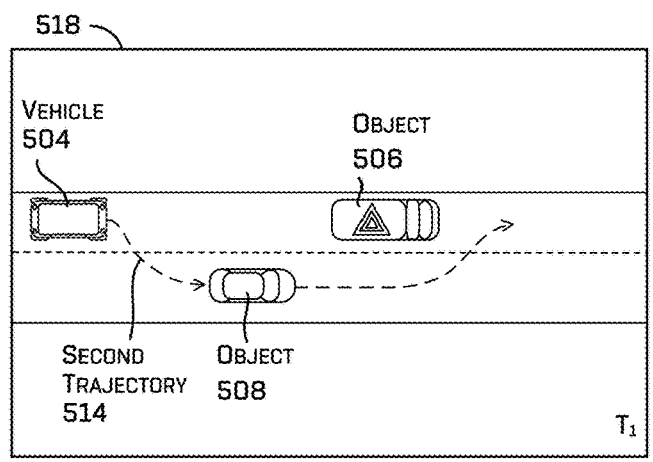
FIG. 5C is an example of evaluating a second trajectory of a vehicle based on predicted occluded region(s) associated with object(s) over time, in accordance with embodiments of the disclosure.
Figure 5C:
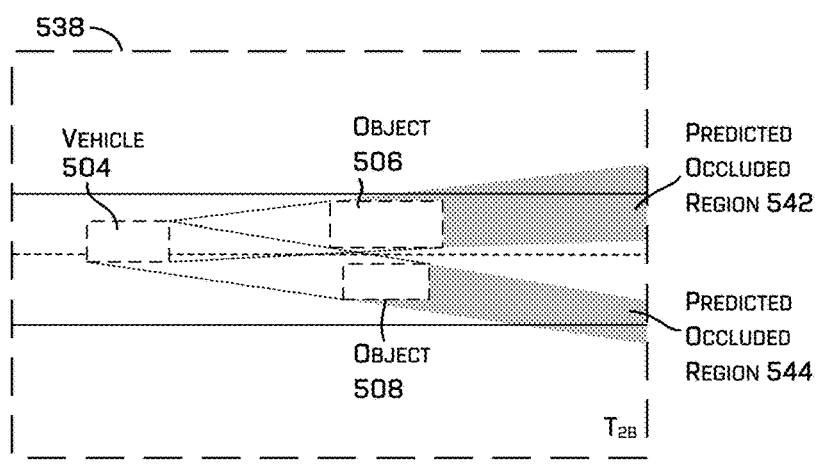
Figure 5C:
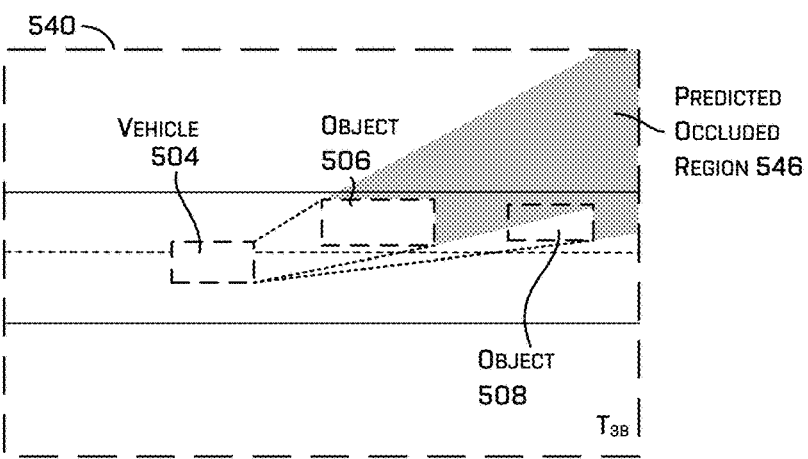

FIG. 5A is an overview of an example 500 presented in FIGS. 5B and 5C. An environment 502 may include a vehicle 504, a first object 506, and a second object 508. In this example, the first object 506 may be a truck that has parked on a drivable surface 510 and has its hazard lights on, such as to make a delivery nearby (e.g., the object 506 may represent a double-parked vehicle). Additionally, in this example, the second object 508 may be a vehicle moving in a same direction as the vehicle 504. The drivable surface 510 may be a two-lane road, with traffic moving in opposite directions in the two lanes, and accordingly, the object 508 can be associated with a predicted trajectory 509 that navigates around the object 506.

In some examples, a planning system of the vehicle 504 may be evaluating a first trajectory 512 and a second trajectory 514 with respect to predicted location(s) of the object 506 and the object 508 over time. As illustrated, the environment 502 may represent an initial time (e.g., $T_1$), at which the vehicle 504 is approaching the stationary object 506, and the object 508 is passing the object 506 in the oncoming traffic lane of the drivable surface 510.

As shown in the environment 516, the first trajectory 512 corresponds to the vehicle 504 staying in the same lane of the drivable surface 510 as the vehicle 504 approaches the object 506. Additionally, as shown in the environment 518, the second trajectory 514 corresponds to the vehicle 504 moving into the oncoming traffic lane of the drivable surface 510, such as to follow the object 508 around the object 506. The planning system of the vehicle 504 can determine predicted locations of the stationary object 506 and the dynamic object 508 at future times, as described above. The operation 520 can include the planning system of the vehicle 504 determining predicted occluded regions for the object 506 and the object 508 based on the first trajectory 512, and as further described in FIG. 5B. The operation 522 can include the planning system of the vehicle 504 determining predicted occluded regions for the object 506 and the object 508 based on the second trajectory 514, and as further described in FIG. 5C.

For instance, FIG. 5B is an example 524 of evaluating the first trajectory 512 of the vehicle 504 based on predicted occluded region(s) associated with object(s) over time, in accordance with embodiments of the disclosure. The environment 516 is reproduced for convenience, depicting the first trajectory 512 that the vehicle 504 may follow. A predicted environment 526 illustrates the vehicle 504, the object 506, and the object 508 at a future time (e.g., at $T_{2A}$, a time after $T_1$), where the vehicle 504 follows the first trajectory 512. Additionally, a predicted environment 528 illustrates the vehicle 504, the object 506, and the object 508 at a subsequent future time (e.g., at $T_{3A}$, a time after $T_{2A}$), where the vehicle 504 continues along the first trajectory 512.

The planning system of the vehicle 504 can generate occlusion grids for the future times $T_{2A}$ and $T_{3A}$ based on the first trajectory 512 of the vehicle 504, the location of the object 506, and a predicted trajectory of the object 508. The occlusion grid generated for the predicted environments 526 and 528 can include indications of occlusion states and occupancy states based on the locations of the object 506 and the object 508. Further, the planning system can use map data associated with the predicted environments 526 and 528 to determine portions of the predicted environments that are occluded by the object 506 (and/or an importance associated therewith) and the object 508 as time passes and the vehicle 504 follows the first trajectory 512. For example, the planning system can use map data associated with the predicted environments 526 and 528 to determine that there may be oncoming traffic on the drivable surface 510, and consequently may associate a higher relative importance to occluded regions of the drivable surface 510 that may include oncoming traffic. The planning system can determine predicted occluded regions 530 and 532 based on the occlusion grid and the map data for the predicted environment 526 at time $T_{2A}$, and a predicted occluded region 534 for the predicted environment 528 at time $T_{3A}$.

The planning system of the vehicle 504 can use the multiple predicted occluded regions 530, 532, and 534 to generate occlusion scores for the predicted occluded regions 530, 532, and 534. In some examples, the planning system can sum, aggregate, or otherwise combine the occlusion scores for the predicted occluded regions 530, 532, and/or 534 to determine a trajectory score for the first trajectory 512. While the example 524 illustrates two future times (e.g., $T_{2A}$ and $T_{3A}$), any number of future times may be evaluated for a particular trajectory, including summing, aggregating, and/or otherwise combining any number of occlusion scores generated for predicted occluded region(s) to determine a trajectory score for the particular trajectory.

FIG. 5C is an example 536 of evaluating the second trajectory 514 of the vehicle 504 based on predicted occluded region(s) associated with object(s) over time, in accordance with embodiments of the disclosure. The environment 518 is reproduced for convenience, depicting the second trajectory 514 that the vehicle 504 may follow. A predicted environment 538 illustrates the vehicle 504, the object 506, and the object 508 at a future time (e.g., at $T_{2B}$, a time after $T_1$), where the vehicle 504 follows the second trajectory 514. Additionally, a predicted environment 540 illustrates the vehicle 504, the object 506, and the object 508 at a subsequent future time (e.g., at $T_{3B}$, a time after $T_{2B}$), where the vehicle 504 continues along the second trajectory 514. The future times $T_{2B}$ and $T_{3B}$ may be substantially the same times as the future times $T_{2A}$ and $T_{3A}$, respectively, such that the planning system of the vehicle 504 can compare how the different trajectories 512 and 514 of the vehicle 504 will likely affect the occluded regions in the environment.

The planning system of the vehicle 504 can generate occlusion grids for the future times $T_{2B}$ and $T_{3B}$ based on the second trajectory 514 of the vehicle 504, the location of the object 506, and a predicted trajectory of the object 508. The occlusion grid generated for the predicted environments 538 and 540 can include indications of occlusion states and occupancy states based on the locations of the object 506 and the object 508. Further, the planning system can use map data associated with the predicted environments 538 and 540 to determine portions of the predicted environments that are occluded by the object 506 and the object 508 as time passes and the vehicle 504 follows the second trajectory 514. The planning system can determine predicted occluded regions 542 and 544 based on the occlusion grid and the map data for the predicted environment 538 at time $T_{2B}$, and a predicted occluded region 546 for the predicted environment 540 at time $T_{3B}$.

The planning system of the vehicle 504 can use the multiple predicted occluded regions 542, 544, and/or 546 to generate occlusion scores for the predicted occluded regions 542, 544, and 546. In some examples, the planning system can sum, aggregate, or otherwise combine the occlusion scores for the predicted occluded regions 542, 544, and 546 to determine a trajectory score for the second trajectory 514. The planning system of the vehicle 504 can compare the trajectory scores associated with the first trajectory 512 and the second trajectory 514 (either as combined and/or on a per occlusion score basis) to determine how to control the vehicle 504 as the vehicle 504 traverses the environment. For example, the planning system may select a trajectory that has the largest area of visibility (e.g., smallest total occluded area), a trajectory that maintains visibility of a region of interest for the longest time, a trajectory based on a trajectory score and/or other costs, and the like. Of course, though depicted for illustrative purposes as two evaluations, multiple points along each trajectory may be determined and summed (or otherwise combined) in order to determine an occlusion score and/or a trajectory score associated therewith.

Figure 6:
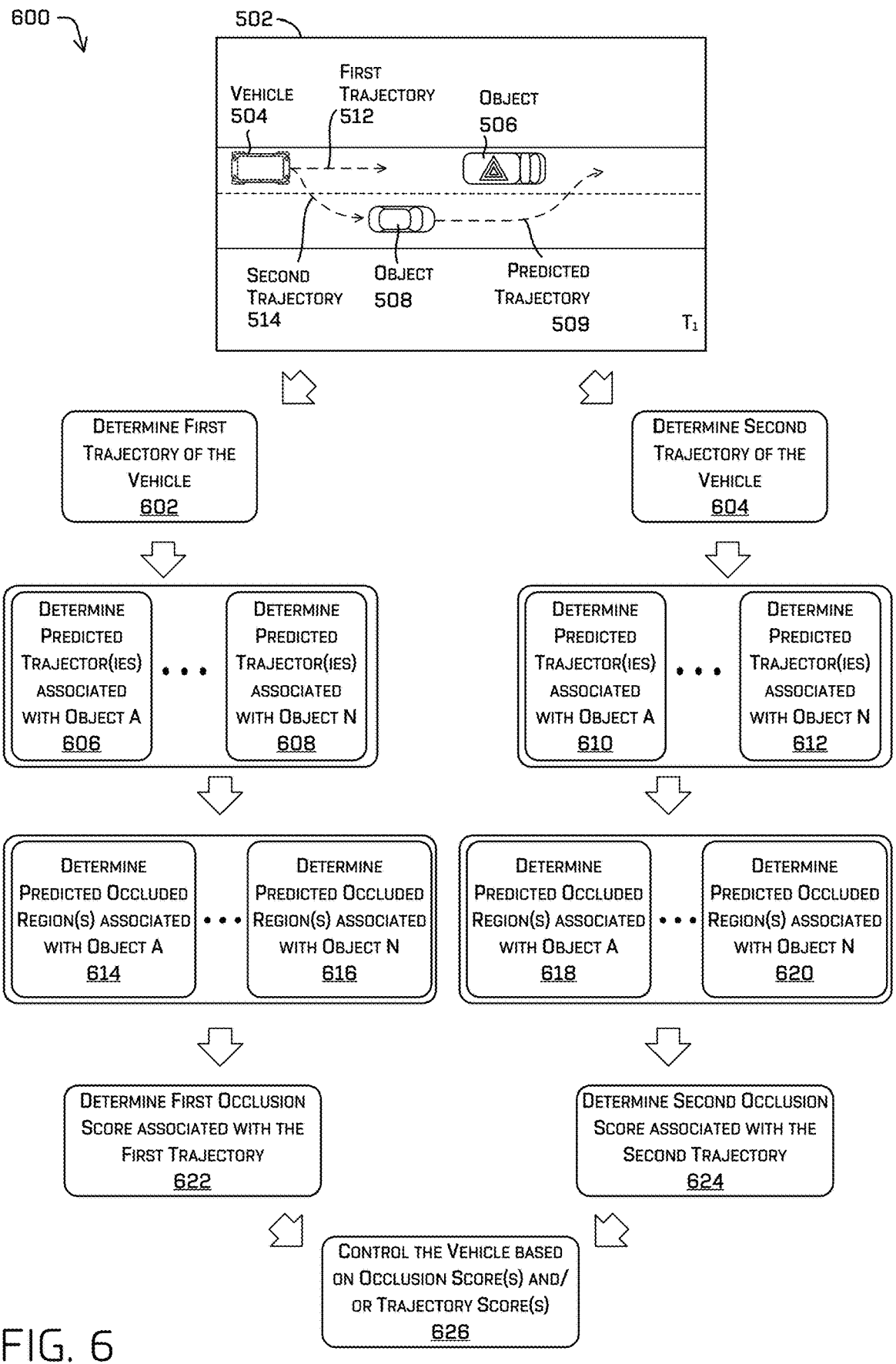
FIG. 6 is a pictorial flow diagram of an example process for evaluating trajector(ies) for a vehicle based on predicted trajector(ies) associated with object(s) and predicted occluded regions associated with the respective object(s) with respect to the vehicle trajector(ies), determining an occlusion score for the vehicle trajector(ies), and controlling the vehicle based on the occlusion scores, in accordance with embodiments of the disclosure.

FIG. 6 is a pictorial flow diagram of an example process 600 for evaluating trajector(ies) for a vehicle based on predicted trajector(ies) associated with object(s) and predicted occluded regions associated with the respective object(s) with respect to the vehicle trajector(ies), determining an occlusion score for the vehicle trajector(ies), and controlling the vehicle based on the occlusion scores, in accordance with embodiments of the disclosure. The environment 502 is reproduced to illustrate various concepts described in relation to the example process 600.

A planning system of the vehicle 504 may perform various functions as the vehicle 504 traverses the environment. For example, at operation 602, the planning system of the vehicle 504 determines a first trajectory (e.g., trajectory 512) of the vehicle. Additionally, at operation 604, the planning system of the vehicle 504 determines a second trajectory (e.g., trajectory 514) of the vehicle. The operation 602 and the operation 604 can be performed substantially simultaneously by the planning system of the vehicle 504.

At operation 606, one or more predicted trajectories are determined for object A (e.g., object 506). The predicted trajectories can be based on a current location of object A (e.g., the object 506), along with evaluating object A over time to determine possible locations of object A based on an object classification, position, speed, acceleration, sensor uncertainty, and the like. In some examples, the predicted trajectory for object A can be a static trajectory, where object A is relatively stationary over time, or a dynamic trajectory where object A moves and/or accelerates over time. The predicted trajectory for object A can represent a predicted location of the object at one or multiple times in the future (e.g., 0.5 seconds, 1 second, 5 seconds, etc.).

Additionally, predicted trajectories for additional objects in the environment can be determined. For instance, at operation 608, one or more predicted trajectories (e.g., the predicted trajectory 509) for object N (e.g., the object 508) are determined. The predicted trajectory for object N can be determined substantially simultaneously as the predicted trajectory for object A, and in a similar (or different) manner as described above. For example, the predicted trajectory for object N can represent a predicted location of the object at one or multiple times in the future (e.g., 0.5 seconds, 1 second, 5 seconds, etc.), where the one or multiple times are substantially the same times that the predicted locations for object A are calculated. The predicted trajectories for the various objects (e.g., object A-object N) can be determined relative to the first trajectory 512 of the vehicle 504. In other words, the planning system determines where the objects will be in relation to the vehicle 504 as the vehicle 504 traverses the environment along the first trajectory 512.

At operation 610, one or more predicted trajectories are determined for object A, which may or may not correspond to the predicted trajectories 606. As a non-limiting example, object A's predicted trajectories may be dependent on the vehicle trajectory and, as such, may differ. Similarly, at operation 612, one or more predicted trajectories are determined for object N (which may, as above, differ from those predicted in 608), which may include determining one or more predicted trajectories for any number of objects from object A to object N. The predicted trajectories determined for object A and object N in operations 610 and 612 can be determined relative to the second trajectory 514 of the vehicle 504. Thus, the planning system determines where the objects will be in relation to the vehicle 504 as the vehicle 504 traverses the environment along the second trajectory 514. In some examples, the number of objects for which trajectories are determined based on the first trajectory 512 may be different than the number of objects for which trajectories are determined based on the second trajectory 514. The operation 610 and the operation 612 can be performed substantially simultaneously by the planning system of the vehicle 504, and may also be performed substantially simultaneously as the operation 606 and the operation 608. Further, the predicted trajectories for object A and/or object N can represent predicted locations of object A and object N relative to the second trajectory 514 at substantially the same times in the future as were determined for object A and object N with respect to the first trajectory 512.

At operation 614, a predicted occluded region associated with object A is determined. Additionally, at operation 616, a predicted occluded region associated with object N is determined. As discussed above, the predicted occluded regions correspond to areas of the environment that cannot be sensed by sensors of the vehicle because an object obstructs the sensor's view of the environment. The predicted occluded regions determined by operation 614 and operation 616 thus represent areas of the environment which may not be able to be viewed by sensors of the vehicle 504 if the vehicle 504 follows the first trajectory 512.

At operation 618, a predicted occluded region associated with object A is determined. At operation 620, a predicted occluded region associated with object N is determined. The predicted occluded regions determined by operation 618 and operation 620 thus represent areas of the environment that may not be able to be sensed by sensors of the vehicle 504 if the vehicle 504 follows the second trajectory 514. Therefore, the predicted occluded regions determined by operation 618 and operation 620 will likely (although not necessarily) be different than the predicted occluded regions determined by operation 614 and operation 616, as the position of the vehicle 504 can be different relative to object A and object N for the first trajectory 512 and the second trajectory 514.

At operation 622, a first occlusion score associated with the first trajectory is determined. The occlusion score may be based on attributes associated with the predicted occluded region, such as one or more of a combination of a percentage of the environment that is occluded by object A-object N, a visibility distance relative to object A-object N (e.g., how close or far the object is from the vehicle), whether the occluded region obstructs a region of importance for the trajectory (e.g., occluded regions "behind" the vehicle may be less important than occluded regions "in front of" the vehicle, regions which would impact travel of the vehicle such as occluded regions that include (or may include) oncoming traffic, etc.), and so forth. In some examples, the first occlusion score can be used to determine a trajectory score for the first trajectory 512, where the trajectory score represents an overall summation or aggregation of the occlusion scores of object A-object N in the environment.

At operation 624, a second occlusion score associated with the second trajectory is determined. The occlusion score for the second vehicle trajectory may be determined using the same or different attributes associated with the predicted occluded region. Additionally, in some examples, the second occlusion score can be used to determine a trajectory score for the second trajectory 514, representing an overall summation or aggregation of the occlusion scores of object A-object N in the environment.

At operation 626, the vehicle is controlled based on the occlusion scores and/or based on the trajectory scores. For example, the vehicle may be controlled to follow a trajectory having the best visibility percentage (e.g., the smallest occluded area), a trajectory that maintains visibility of an area of importance (e.g., does not occlude the area of importance), a trajectory which has no occlusion score at or above a threshold occlusion score, and so forth.

Figure 7:
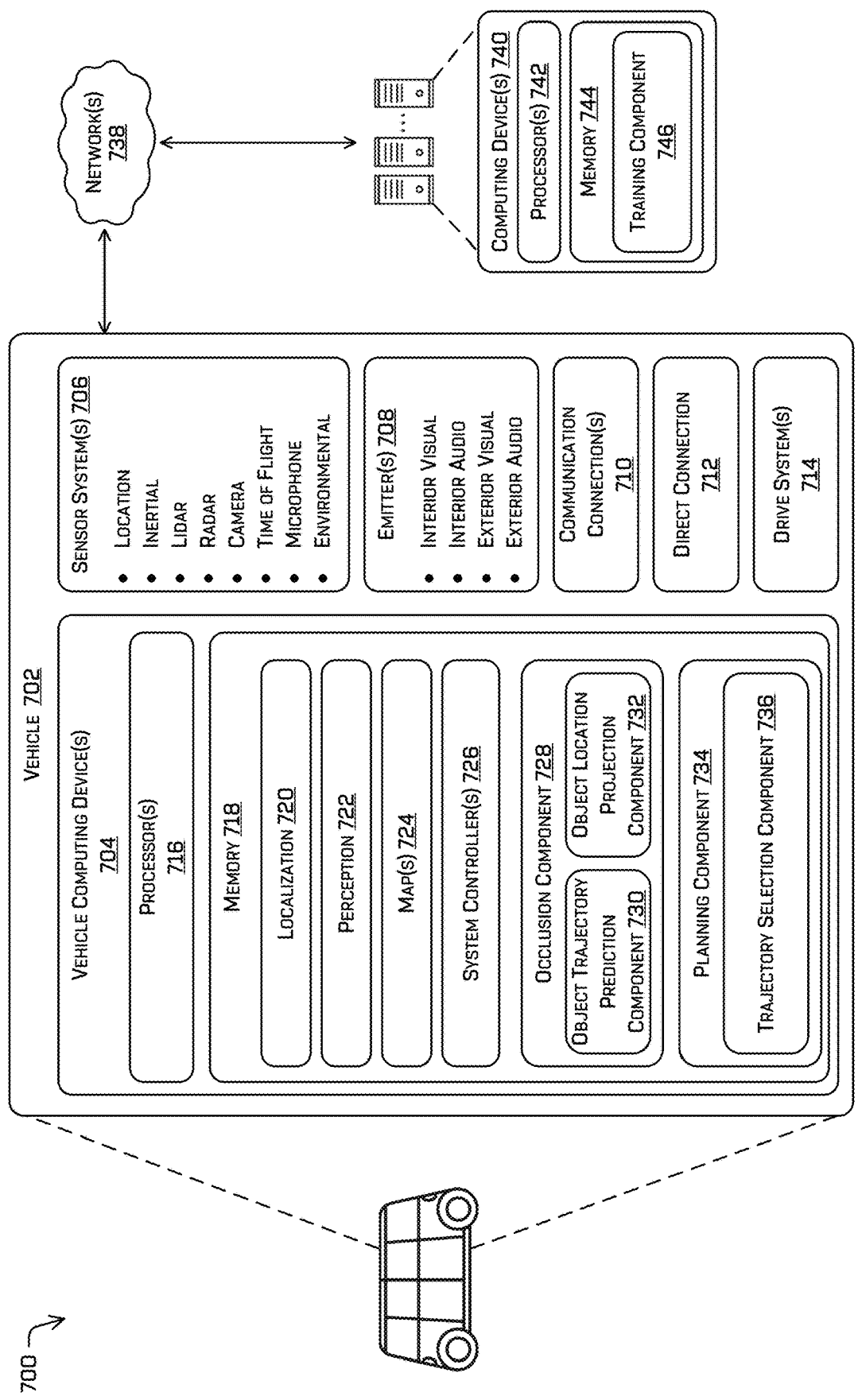
FIG. 7 depicts a block diagram of an example system for implementing the techniques described herein.

FIG. 7 depicts a block diagram of an example system 700 for implementing the techniques described herein. In at least one example, the system 700 can include a vehicle 702, which can correspond to the vehicle 112 of FIG. 1, the vehicle 204 of FIG. 2, the vehicle 304 of FIG. 3, the vehicle 404 of FIG. 4, and/or the vehicle 504 of FIGS. 5A-5C.

The vehicle 702 can include vehicle computing device(s) 704, one or more sensor systems 706, one or more emitters 708, one or more communication connections 710, at least one direct connection 712, and one or more drive systems 714.

The vehicle computing device(s) 704 can include one or more processors 716 and memory 718 communicatively coupled with the one or more processors 716. In the illustrated example, the vehicle 702 is an autonomous vehicle; however, the vehicle 702 could be any other type of vehicle or robotic platform. In the illustrated example, the memory 718 of the vehicle computing device(s) 704 stores a localization component 720, a perception component 722, one or more maps 724, one or more system controllers 726, an occlusion component 728, an object trajectory prediction component 730, an object location projection component 732, a planning component 734, and a trajectory selection component 736. Though depicted in FIG. 7 as residing in the memory 718 for illustrative purposes, it is contemplated that the localization component 720, the perception component 722, the one or more maps 724, the one or more system controllers 726, the occlusion component 728, the object trajectory prediction component 730, the object location projection component 732, the planning component 734, and the trajectory selection component 736 can additionally, or alternatively, be accessible to the vehicle 702 (e.g., stored on, or otherwise accessible by, memory remote from the vehicle 702).

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 720 can provide data to various components of the vehicle 702 to determine an initial position of an autonomous vehicle for generating a trajectory and/or for determining to retrieve map data including an occlusion grid from memory, as discussed herein.

In some instances, the perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, stoplight, stop sign, unknown, etc.). In additional or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 718 can further include one or more maps 724 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 724 can include at least one map (e.g., images and/or a mesh). In some examples, the vehicle 702 can be controlled based at least in part on the maps 724. That is, the maps 724 can be used in connection with the localization component 720, the perception component 722, the occlusion component 728, and/or the planning component 734 to determine a location of the vehicle 702, identify objects in an environment, and/or generate routes and/or trajectories to navigate within an environment.

In some examples, the one or more maps 724 can be stored on a remote computing device(s) (such as the computing device(s) 740) accessible via network(s) 738. In some examples, multiple maps 724 can be stored based on, for example, a characteristic (e.g., type of entity, time of day, day of week, season of the year, etc.). Storing multiple maps 724 can have similar memory requirements, but increase the speed at which data in a map can be accessed.

In some examples, the one or more maps 724 can store occlusion grids associated with individual locations in an environment. For example, as the vehicle 702 traverses the environment and as maps representing an area proximate to the vehicle 702 are loaded into memory, one or more occlusion grids associated with a location can be loaded into memory as well. In some examples, an occlusion grid can be generated dynamically based on map data.

In general, the occlusion component 728 can determine occluded areas of an environment caused by one or multiple objects in the environment, including predicting occluded areas in the environment at times in the future. In some instances, the occlusion component 728 can provide occlusion information to the planning component 734 to determine when and/or how to control the vehicle 702 to traverse an environment. As discussed herein, the occlusion component 728 can receive lidar data, image data, map data, and the like to determine occlusion-related information in an environment. Examples of generating and/or using an occlusion grid are discussed in U.S. patent application Ser. No. 16/011,436, filed Jun. 18, 2018. Application Ser. No. 16/011,436 is herein incorporated by reference, in its entirety.

The object trajectory prediction component 730 included in the occlusion component 728 determines trajectories of objects in the environment, such as in real time, and can also predict future trajectories of objects. A predicted trajectory can be based on a current location of an object, along with evaluating the object over time to determine possible locations of the object based on an object classification, position, speed, acceleration, sensor uncertainty, and the like. The object trajectory prediction component 730 may be configured to evaluate and/or predict multiple object trajectories with respect to multiple possible vehicle trajectories substantially simultaneously. Examples of generating one or more predicted trajectories are discussed in U.S. patent application Ser. No. 16/151,607, filed Oct. 4, 2018. Application Ser. No. 16/151,607 is herein incorporated by reference, in its entirety.

The object location projection component 732 can determine predicted occluded regions associated with various object trajectories with respect to a vehicle trajectory. For example, the object location projection component 732 can project an occluded region onto a map 724 of the environment surrounding the vehicle to determine what "known" parts of the environment will be occluded by the object. The map 724 may be used by the object location projection component 732 to determine areas of importance of the environment, such as crosswalks, intersections, bike lanes, on-ramps, and the like. In some instances, the object location projection component 732 can use ray casting techniques to determine predicted occluded regions associated with an object. Further, the object location projection component 732 can determine an occlusion score for the predicted occluded regions based on a relative importance of an area of the environment which is predicted to be occluded. Additionally or alternatively, the object location projection component 732 may determine an occlusion score based on other factors, such as a percentage of the environment obstructed by the occluded region, a distance from the vehicle to the occluded region, map data associated with the occluded region (e.g., indicating a crosswalk region, a driveway, etc.), and the like. In some examples, the object location projection component 732 can aggregate occlusion scores into a trajectory score for a particular trajectory, where the trajectory score may correspond to a trajectory or action on behalf of the vehicle 702 will result in better (or worse) visibility for the vehicle 702.

In general, the planning component 734 can determine a path for the vehicle 702 to follow to traverse the environment. For example, the planning component 734 can determine various routes and trajectories and various levels of detail. For example, the planning component 734 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 734 can generate an instruction for guiding the autonomous vehicle along at least a portion of the route from the first location to the second location. In at least one example, the planning component 734 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate.

In some instances, the planning component 734 can generate one or more trajectories for the vehicle 702 based at least in part on the occlusion score(s) and/or the trajectory score(s) determined for various trajectories, as discussed herein. In some examples, the planning component 734 can use temporal logic, such as linear temporal logic and/or signal temporal logic, to evaluate one or more trajectories of the vehicle 702. Details of utilizing temporal logic in the planning component 734 are discussed in U.S. patent application Ser. No. 15/632,147, which is herein incorporated by reference, in its entirety.

In at least one example, the vehicle computing device(s) 704 can include one or more system controllers 726, which can be configured to control steering, propulsion, braking, safety, emitters, communication, and other systems of the vehicle 702. These system controller(s) 726 can communicate with and/or control corresponding systems of the drive system(s) 714 and/or other components of the vehicle 702.

As can be understood, the components discussed herein (e.g., the localization component 720, the perception component 722, the one or more maps 724, the one or more system controllers 726, the occlusion component 728, the object trajectory prediction component 730, the object location projection component 732, the planning component 734, and the trajectory selection component 736) are described as divided for illustrative purposes. However, the operations performed by the various components can be combined or performed in any other component. By way of example, object location prediction/projection functions may be performed by the perception component 722 (e.g., rather than the object trajectory prediction component 730) to reduce the amount of data transferred by the system.

In at least one example, the sensor system(s) 706 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 can include multiple instances of each of these or other types of sensors. For instance, the lidar sensors can include individual lidar sensors located at the corners, front, back, sides, and/or top of the vehicle 702. As another example, the camera sensors can include multiple cameras disposed at various locations about the exterior and/or interior of the vehicle 702. The sensor system(s) 706 can provide input to the vehicle computing device(s) 704. Additionally or alternatively, the sensor system(s) 706 can send sensor data, via the one or more networks 738, to the one or more computing device(s) at a particular frequency, after a lapse of a predetermined period of time, in near real-time, etc.

The vehicle 702 can also include one or more emitters 708 for emitting light and/or sound, as described above. The emitters 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device(s) 704 to another computing device or a network, such as network(s) 738. For example, the communications connection(s) 710 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive systems 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor systems to detect conditions of the drive system(s) 714 and/or the surroundings of the vehicle 702. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 714. Furthermore, the drive system(s) 714 also include one or more communication connection(s) that enable communication by the respective drive system with one or more other local or remote computing device(s).

In at least one example, the direct connection 712 can provide a physical interface to couple the one or more drive system(s) 714 with the body of the vehicle 702. For example, the direct connection 712 can allow the transfer of energy, fluids, air, data, etc. between the drive system(s) 714 and the vehicle. In some instances, the direct connection 712 can further releasably secure the drive system(s) 714 to the body of the vehicle 702.

In at least one example, the localization component 720, the perception component 722, the one or more maps 724, the one or more system controllers 726, the occlusion component 728, the object trajectory prediction component 730, the object location projection component 732, the planning component 734, and the trajectory selection component 736 can process sensor data, as described above, and can send their respective outputs, over the one or more network(s) 738, to one or more computing device(s) 740. In at least one example, the localization component 720, the perception component 722, the one or more maps 724, the one or more system controllers 726, the occlusion component 728, the object trajectory prediction component 730, the object location projection component 732, the planning component 734, and the trajectory selection component 736 can send their respective outputs to the one or more computing device(s) 740 at a particular frequency, after a lapse of a predetermined period of time, in near real-time, etc.

In some examples, the vehicle 702 can send sensor data to one or more computing device(s) 740 via the network(s) 738. In some examples, the vehicle 702 can send raw sensor data to the computing device(s) 740. In other examples, the vehicle 702 can send processed sensor data and/or representations of sensor data to the computing device(s) 740. In some examples, the vehicle 702 can send sensor data to the computing device(s) 740 at a particular frequency, after a lapse of a predetermined period of time, in near real-time, etc. In some cases, the vehicle 702 can send sensor data (raw or processed) to the computing device(s) 740 as one or more log files.

The computing device(s) 740 can include processor(s) 742 and a memory 744 storing a training component 746.

In some instances, the training component 746 can include functionality to train one or more models to determine predictions of object locations and/or trajectories, determine predictions of occluded regions, determine how trajectories may be generated and/or may change in response to object locations in the environment, and the like. In some instances, the training component 746 can communicate information generated by the one or more models to the vehicle computing device(s) 704 to revise how to control the vehicle 702 in response to different situations.

For instance, aspects of some or all of the components discussed herein can include any models, algorithms, and/or machine learning algorithms. For example, in some instances, the components in the memory 744 (and the memory 718, discussed above) can be implemented as a neural network. In some examples, the training component 746 can utilize a neural network to generate and/or execute one or more models to improve various aspects of occlusion analysis for trajectory planning.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 716 of the vehicle 702 and the processor(s) 742 of the computing device(s) 740 can be any suitable processor capable of executing instructions to process data and perform operations as described herein. By way of example and not limitation, the processor(s) 716 and 742 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 744 are examples of non-transitory computer-readable media. The memory 718 and 744 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 7 is illustrated as a distributed system, in alternative examples, components of the vehicle 702 can be associated with the computing device(s) 740 and/or components of the computing device(s) 740 can be associated with the vehicle 702. That is, the vehicle 702 can perform one or more of the functions associated with the computing device(s) 740, and vice versa.

Further, aspects of the occlusion component 728 and/or the planning component 734 can be performed on any of the devices discussed herein.

Figure 8:
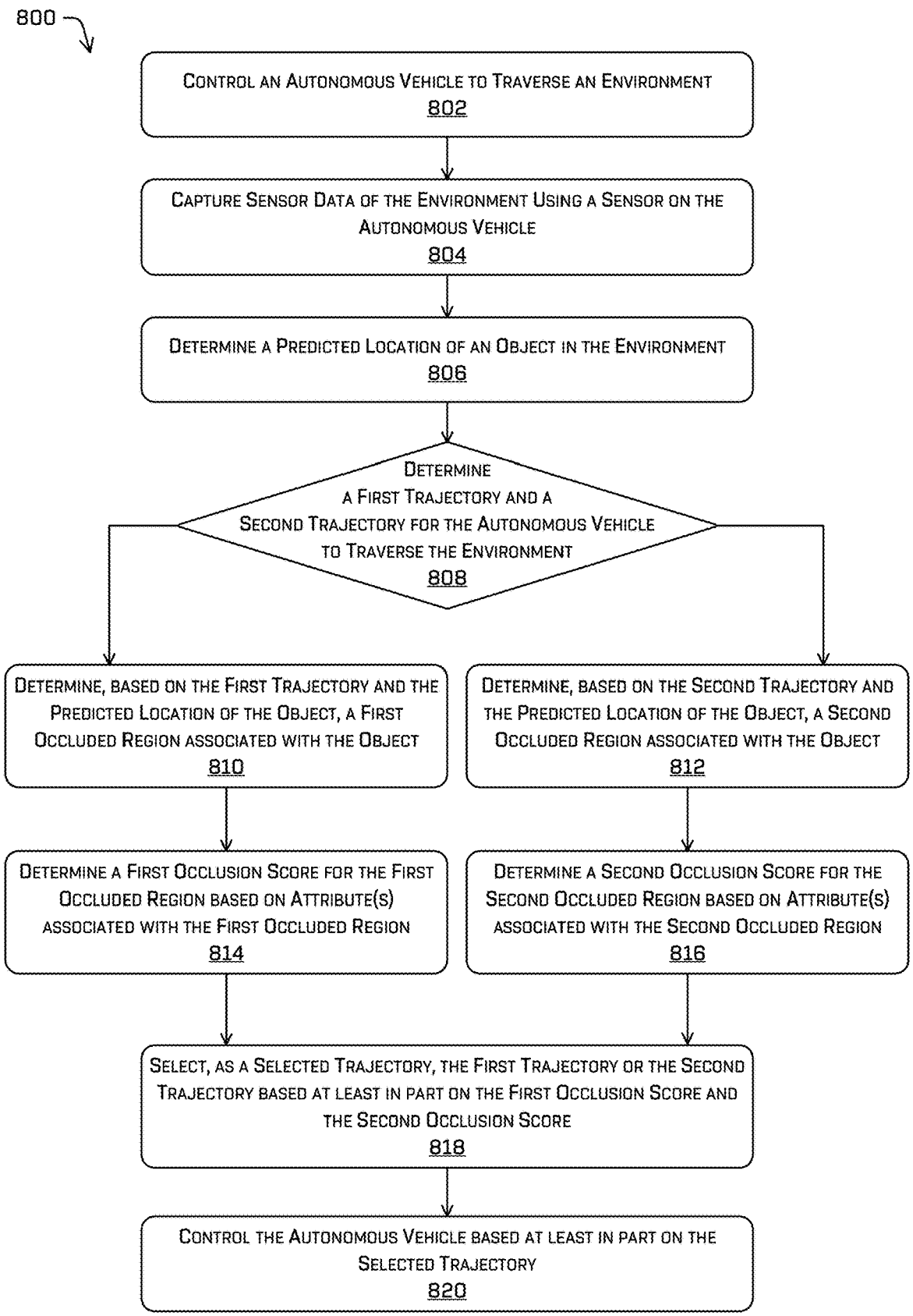
FIG. 8 depicts an example process for capturing sensor data, determining predicted locations for objects, determining trajectories for an autonomous vehicle to traverse the environment, determining predicted occluded regions associated with the predicted locations for the objects based on the different vehicle trajectories, selecting a trajectory based on costs associated with the occluded regions, and controlling the autonomous vehicle based on the selected trajectory, in accordance with embodiments of the disclosure.

FIG. 8 depicts an example process 800 for capturing sensor data, determining predicted locations for objects, determining trajectories for an autonomous vehicle to traverse the environment, determining predicted occluded regions associated with the predicted locations for the objects based on the different vehicle trajectories, selecting a trajectory based on costs associated with the occluded regions, and controlling the autonomous vehicle based on the selected trajectory, in accordance with embodiments of the disclosure. For example, some or all of the process 800 can be performed by one or more components in FIG. 8, as described herein. For example, some or all of the process 800 can be performed by the vehicle computing device(s) 704. Further, any of the operations described in the example process 800 may be executed in parallel, in a different order than depicted in the process 800, and/or omit any of the operations of the depicted process 800.

At operation 802, the process can include controlling an autonomous vehicle to traverse an environment. For example, the operation 802 may include controlling the autonomous vehicle to follow one or more trajectories between waypoints to reach a destination.

At operation 804, the process can include capturing sensor data of the environment using a sensor on the autonomous vehicle. In some instances, the operation 804 can include capturing lidar data, image data, radar data, time of flight data, and the like, of the environment.

At operation 806, the process can include determining a predicted location of an object in the environment. In some examples, the operation 806 can determine a predicted location of an object using a discretized probability distribution or heat map including prediction probabilities associated with possible locations of the object in the environment. In some examples, the operation 806 can include determining that the object is a static object, in which case the object may remain stationary.

At operation 808, the process can include determining a first trajectory and a second trajectory for the autonomous vehicle to traverse the environment. The operation 808 may be based on a variety of factors, including physical limitations of the autonomous vehicle, legal restrictions of where the autonomous vehicle operates associated therewith, and/or the intended destination of the autonomous vehicle, to name a few examples. Of course, the operation 808 can include determining any number of trajectories or action for the autonomous vehicle.

At operation 810, the process can include determining, based on the first trajectory and the predicted location of the object (which may be based at least in part on the first trajectory), a first occluded region associated with the object. The first occluded region may be determined based at least in part on a map of the environment, such that a planning system of the autonomous vehicle can determine a size and/or relative importance of known components of the environment which may be occluded by the object should the autonomous vehicle follow the first trajectory.

At operation 812, the process can include determining, based on the second trajectory and the predicted location of the object (which may be determined based at least in part on the second trajectory), a second occluded region associated with the object. The second occluded region may also be determined based at least in part on a map of the environment, such that a planning system of the autonomous vehicle can determine a size and/or relative importance of known components of the environment which may be occluded by the object should the autonomous vehicle follow the second trajectory. In some examples, the operation 812 is performed substantially simultaneously as the operation 810.

At operation 814, the process can include determining a first occlusion score for the first occluded region based on one or more attributes associated with the first occluded region. The first occlusion score for the first occluded region may be based on the size and/or relative importance of the known components of the environment which may be occluded by the object should the autonomous vehicle follow the first trajectory. In some instances, attributes of the occluded region can be based on map data, dynamic data (e.g., data captured indicating a pedestrian, animal, vehicle, and the like in the occluded region), or other data.

At operation 816, the process can include determining a second occlusion score for the second occluded region based on one or more attributes associated with the second occluded region. The second occlusion score for the second occluded region may also be based on the size and/or relative importance of the known components of the environment which may be occluded by the object should the autonomous vehicle follow the second trajectory. In some instances, attributes of the occluded region can be based on map data, dynamic data (e.g., data captured indicating a pedestrian, animal, vehicle, and the like in the occluded region), or other data. In some examples, the operation 814 is performed substantially simultaneously as the operation 816.

At operation 818, the process can include selecting, as a selected trajectory, the first trajectory or the second trajectory based at least in part on the first occlusion score and/or the second occlusion score. Selecting the first trajectory or the second trajectory may be based on which trajectory has an occlusion score that represents better predicted visibility for the vehicle along the selected trajectory. In some cases, a trajectory having an occlusion score that represents worse predicted visibility may be selected due to other systems of the vehicle overriding the selection, such as for safety concerns or to follow traffic laws. As discussed herein, the operation 818 can include selecting the first trajectory or the second trajectory based on other costs, such as a reference cost, an obstacle cost, a steering cost, an acceleration cost, and the like.

At operation 820, the process can include controlling the autonomous vehicle based at least in part on the selected trajectory. In this manner, the techniques herein can incorporate predicted occluded regions into controlling an autonomous vehicle.

Example Clauses

A: A system comprising: one or more processors; and one or more computer-readable media storing instructions executable by the one or more processors, wherein the instructions, when executed, cause the system to perform operations comprising: capturing sensor data of an environment using a sensor of an autonomous vehicle; determining a first trajectory for the autonomous vehicle to traverse in the environment; determining a second trajectory for the autonomous vehicle to traverse in the environment; detecting, based at least in part in the sensor data, a current position of an object in the environment; determining, based at least in part on the sensor data, a predicted location of the object; determining, based at least in part on the first trajectory and the predicted location of the object, a first occluded region associated with the object; determining, based at least in part on the second trajectory and the predicted location of the object, a second occluded region associated with the object; selecting, as a selected trajectory, the first trajectory or the second trajectory based at least in part on a first cost associated with the first occluded region or a second cost associated with the second occluded region; and controlling the autonomous vehicle based at least in part on the selected trajectory.

B: The system of paragraph A, wherein the predicted location is a first predicted location associated with a first time, and wherein the operations further comprise: determining, based at least in part on the sensor data, a second predicted location of the object in the environment, the second predicted location associated with a second time after the first time; and determining, based at least in part on the first trajectory and the second predicted location, a third occluded region associated with the object; wherein selecting the first trajectory or the second trajectory is further based at least in part on a third cost associated with the third occluded region.

C: The system of paragraph B, wherein: the object is a stationary object and the first predicted location corresponds to the second predicted location; or the object is a dynamic object and the first predicted location is different than the second predicted location.

D: The system of any of paragraphs A-C, the operations further comprising: determining an occlusion score for the first occluded region based at least in part on map data associated with the environment, wherein selecting the selected trajectory is further based on the occlusion score.

E: The system of any of paragraphs A-D, the operations further comprising determining, based at least in part on the predicted location of the object, multiple predicted trajectories for the object, wherein determining one or more of the multiple predicted trajectories is based at least in part on at least one of: a heat map received from a machine learning model trained to generate the heat map representing the object; a probability map based at least in part on a classification of the object, an initial position of the object, a velocity of the object; or a physics-based model associated with the object.

F: A method comprising: receiving a trajectory for a vehicle to follow in an environment; determining a predicted location for an object in the environment, the predicted location associated with a future time; determining, based at least in part on the predicted location and the trajectory, an occluded region associated with the object at the future time; and controlling the vehicle based at least in part on the occluded region.

G: The method of paragraph F, further comprising: determining an occlusion score associated with the occluded region, wherein the occlusion score is based at least in part on map data.

H: The method of paragraph G, further comprising determining an occlusion state and an occupancy state of an occlusion field of the occlusion grid at the future time.

I: The method of any of paragraphs F-H, further comprising determining an occlusion score for the occluded region based on an attribute associated with the occluded region, wherein controlling the vehicle is further based on the occlusion score for the occluded region.

J: The method of any of paragraphs F-I, wherein the object is a first object, the predicted location is a first predicted location, and the occluded region is a first occluded region, the method further comprising: determining a second predicted location for a second object in the environment, the second predicted location associated with the future time; and determining, based at least in part on the second predicted location and the trajectory, a second occluded region associated with the second object at the future time, wherein controlling the vehicle is further based on the second occluded region.

K: The method of paragraph J, further comprising: determining a first occlusion score for the first occluded region based on a first attribute associated with the first occluded region; determining a second occlusion score for the second occluded region based on a second attribute associated with the second occluded region; and determining a trajectory score for the trajectory based at least in part on the first occlusion score and the second occlusion score, wherein controlling the vehicle is further based on the trajectory score for the trajectory.

L: The method of paragraph K, wherein the trajectory is a first trajectory and the trajectory score is a first trajectory score, the method further comprising: determining a second trajectory score for a second trajectory; and selecting, as a selected trajectory, the first trajectory or the second trajectory based at least in part on the first trajectory score or the second trajectory score, wherein controlling the vehicle is further based at least in part on the selected trajectory.

M: The method of paragraph K or L, wherein the first attribute is associated with one or more of: map data associated with the first occluded region; one or more objects in the first occluded region; a distance between a point associated with the trajectory and the first occluded region; a size of the first occluded region; a time period associated with the first occluded region; or a direction of travel associated with the vehicle;

N: The method of any of paragraphs F-M, wherein the predicted location of the object in the environment is based at least in part on sensor data received from one or more of a lidar sensor, a radar sensor, an image sensor, or a time of flight sensor.

O: A non-transitory computer-readable medium storing instructions that, when executed, cause one or more processors to perform operations comprising: receiving a first trajectory for a vehicle to follow in an environment; receiving a second trajectory for the vehicle to follow in the environment; determining a predicted location of an object in the environment at a future time; determining, based at least in part on the first trajectory and the predicted location of the object, a first occluded region associated with the object; determining, based at least in part on the second trajectory and the predicted location of the object, a second occluded region associated with the object; and controlling the vehicle based at least in part on the first occluded region and the second occluded region.

P: The non-transitory computer-readable medium of paragraph O, wherein the predicted location is a first predicted location, the future time is a first time, and wherein the operations further comprise: determining a second predicted location of the object in the environment, the second predicted location associated with a second time after the first time; and determining, based at least in part on the first trajectory and the second predicted location, a third occluded region associated with the object; wherein controlling the vehicle is further based at least in part on the third occluded region.

Q: The non-transitory computer-readable medium of paragraph P, wherein: the object is a stationary object and the first predicted location corresponds to the second predicted location; or the object is a dynamic object and the first predicted location is different than the second predicted location.

R: The non-transitory computer-readable medium of any of paragraphs O-Q, wherein the operations further comprise: determining an occlusion score for the first occluded region based at least in part on map data associated with the environment, wherein controlling the vehicle is further based on the occlusion score.

S: The non-transitory computer-readable medium of any of paragraphs O-R, wherein determining the predicted location of the object in the environment is based at least in part on at least one of: a heat map received from a machine learning model trained to generate the heat map representing the object; a probability map based at least in part on a classification of the object, an initial position of the object, a velocity of the object; or a physics-based model associated with the object.

T: The non-transitory computer-readable medium of any of paragraphs O-S, wherein determining the predicted location of the object is based at least in part on sensor data received from one or more of a lidar sensor, a radar sensor, an image sensor, or a time of flight sensor.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
capturing sensor data of an environment using a sensor of an autonomous vehicle;
determining a first trajectory for the autonomous vehicle to traverse in the environment;
determining a second trajectory for the autonomous vehicle to traverse in the environment;
detecting, based at least in part on the sensor data, a current position of an object in the environment;
determining, based at least in part on the sensor data, a predicted location of the object;
determining, based at least in part on the first trajectory and the predicted location of the object, a first predicted occluded region associated with the object, the first predicted occluded region including at least a first portion of a non-drivable surface of the environment;
determining, based at least in part on the second trajectory and the predicted location of the object, a second predicted occluded region associated with the object, the second predicted occluded region including at least a second portion of the non-drivable surface of the environment;
determining that a first area of the first predicted occluded region is smaller than a second area of the second predicted occluded region;
selecting, as a selected trajectory, the first trajectory based at least in part on a first cost associated with the first area of the first predicted occluded region being less than a second cost associated with the second area of the second predicted occluded region; and
controlling the autonomous vehicle based at least in part on the selected trajectory.

2. The system of claim 1, wherein the predicted location is a first predicted location associated with a first time, and wherein the operations further comprise:
determining, based at least in part on the sensor data, a second predicted location of the object in the environment, the second predicted location associated with a second time after the first time; and
determining, based at least in part on the first trajectory and the second predicted location, a third predicted occluded region associated with the object;
wherein selecting the first trajectory or the second trajectory is further based at least in part on a third cost associated with the third predicted occluded region.

3. The system of claim 2, wherein:
the object is a stationary object and the first predicted location corresponds to the second predicted location; or
the object is a dynamic object and the first predicted location is different than the second predicted location.

4. The system of claim 1, the operations further comprising:
determining an occlusion score for the first predicted occluded region based at least in part on map data associated with the environment,
wherein selecting the selected trajectory is further based on the occlusion score.

5. The system of claim 1, the operations further comprising determining, based at least in part on the predicted location of the object, multiple predicted trajectories for the object, wherein determining one or more of the multiple predicted trajectories is based at least in part on at least one of:
a heat map received from a machine learning model trained to generate the heat map representing the object;

a probability map based at least in part on a classification of the object, an initial position of the object, a velocity of the object; or a physics-based model associated with the object.

6. A method comprising:

receiving a trajectory for a vehicle to follow in an environment;

determining a predicted location of an object in the environment, the predicted location associated with a future time;

determining, based at least in part on the predicted location and the trajectory, a predicted occluded region associated with the object at the future time from a perspective of the vehicle following the trajectory, the predicted occluded region including at least a portion of a non-drivable surface of the environment; and controlling the vehicle to reduce a size associated with the predicted occluded region.

7. The method of claim 6, further comprising:

determining an occlusion score associated with the predicted occluded region, wherein the occlusion score is based at least in part on map data.

8. The method of claim 7, further comprising determining an occlusion state and an occupancy state of an occlusion field of an occlusion grid at the future time.

9. The method of claim 6, further comprising determining an occlusion score for the predicted occluded region based on an attribute associated with the predicted occluded region, wherein controlling the vehicle is further based on the occlusion score for the predicted occluded region.

10. The method of claim 6, wherein the object is a first object, the predicted location is a first predicted location, and the predicted occluded region is a first predicted occluded region, the method further comprising:

determining a second predicted location for a second object in the environment, the second predicted location associated with the future time; and determining, based at least in part on the second predicted location and the trajectory, a second predicted occluded region associated with the second object at the future time, wherein controlling the vehicle is further based on the second predicted occluded region.

11. The method of claim 10, further comprising:

determining a first occlusion score for the first predicted occluded region based on a first attribute associated with the first predicted occluded region;

determining a second occlusion score for the second predicted occluded region based on a second attribute associated with the second predicted occluded region; and determining a trajectory score for the trajectory based at least in part on the first occlusion score and the second occlusion score, wherein controlling the vehicle is further based on the trajectory score for the trajectory.

12. The method of claim 11, wherein the trajectory is a first trajectory and the trajectory score is a first trajectory score, the method further comprising:

determining a second trajectory score for a second trajectory; and selecting, as a selected trajectory, the first trajectory or the second trajectory based at least in part on the first trajectory score or the second trajectory score, wherein controlling the vehicle is further based at least in part on the selected trajectory.

13. The method of claim 11, wherein the first attribute is associated with one or more of:

map data associated with the first predicted occluded region;

one or more objects in the first predicted occluded region;

a distance between a point associated with the trajectory and the first predicted occluded region;

a size of the first predicted occluded region;

a time period associated with the first predicted occluded region; or a direction of travel associated with the vehicle.

14. The method of claim 6, wherein the predicted location of the object in the environment is based at least in part on sensor data received from one or more of a lidar sensor, a radar sensor, an image sensor, or a time of flight sensor.

15. A non-transitory computer-readable medium storing instructions that, when executed, cause one or more processors to perform operations comprising:

receiving a first trajectory for a vehicle to follow in an environment;

receiving a second trajectory for the vehicle to follow in the environment;

determining a predicted location of an object in the environment at a future time;

determining, based at least in part on the first trajectory and the predicted location of the object, a first predicted occluded region associated with the object, the first predicted occluded region including at least a first portion of a non-drivable surface of the environment;

determining, based at least in part on the second trajectory and the predicted location of the object, a second predicted occluded region associated with the object, the second predicted occluded region including at least a second portion of the non-drivable surface of the environment;

determining that a first size associated with the first predicted occluded region is smaller than a second size associated with the second predicted occluded region; and controlling the vehicle to follow the first trajectory based at least in part on the first size associated with the first predicted occluded region being smaller than the second size associated with the second predicted occluded region.

16. The non-transitory computer-readable medium of claim 15, wherein the predicted location is a first predicted location, the future time is a first time, and wherein the operations further comprise:

determining a second predicted location of the object in the environment, the second predicted location associated with a second time after the first time; and determining, based at least in part on the first trajectory and the second predicted location, a third predicted occluded region associated with the object;

wherein controlling the vehicle is further based at least in part on the third predicted occluded region.

17. The non-transitory computer-readable medium of claim 16, wherein:

the object is a stationary object and the first predicted location corresponds to the second predicted location; or the object is a dynamic object and the first predicted location is different than the second predicted location.

18. The non-transitory computer-readable medium of claim 15, wherein the operations further comprise:

determining an occlusion score for the first predicted occluded region based at least in part on map data associated with the environment, wherein controlling the vehicle is further based on the occlusion score.

19. The non-transitory computer-readable medium of claim 15, wherein determining the predicted location of the object in the environment is based at least in part on at least one of:
- a heat map received from a machine learning model trained to generate the heat map representing the object;
- a probability map based at least in part on a classification of the object, an initial position of the object, a velocity of the object; or
- a physics-based model associated with the object.

20. The non-transitory computer-readable medium of claim 15, wherein determining the predicted location of the object is based at least in part on sensor data received from one or more of a lidar sensor, a radar sensor, an image sensor, or a time of flight sensor.

\* \* \* \* \*